US010154229B2

(12) United States Patent
Sato et al.

(10) Patent No.: US 10,154,229 B2
(45) Date of Patent: Dec. 11, 2018

(54) STORAGE MEDIUM STORING A VIDEO REPRODUCTION CONTROLLING PROGRAM, VIDEO REPRODUCTION CONTROLLING APPARATUS AND VIDEO REPRODUCTION CONTROLLING METHOD

(75) Inventors: Noriyuki Sato, Kyoto (JP); Shinobu Suzuki, Kyoto (JP); Yasutaka Takeuchi, Kyoto (JP); Takafumi Masaoka, Kyoto (JP); Kyohei Seki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1645 days.

(21) Appl. No.: 12/219,932

(22) Filed: Jul. 30, 2008

(65) Prior Publication Data
US 2009/0149252 A1 Jun. 11, 2009

(30) Foreign Application Priority Data
Dec. 5, 2007 (JP) ................. 2007-314490

(51) Int. Cl.
*H04N 5/85* (2006.01)
*G11B 19/02* (2006.01)
(Continued)

(52) U.S. Cl.
CPC ............ *H04N 5/85* (2013.01); *G11B 19/025* (2013.01); *G11B 27/105* (2013.01);
(Continued)

(58) Field of Classification Search
CPC .. A63F 13/497; A63F 2300/634; A63F 13/85; A63F 13/86; H04N 5/85;
(Continued)

(56) References Cited

U.S. PATENT DOCUMENTS 5,169,319 A * 12/1992 Potocki ................ A61B 5/16
434/236
5,684,715 A * 11/1997 Palmer ............... G06F 17/3079
345/157
(Continued)

FOREIGN PATENT DOCUMENTS

JP 2007-067593 3/2007

OTHER PUBLICATIONS

"Road Blaster—Full Walkthrough", Youtube.com, retrieved from: «https://www.youtube.com/watch?v=DSpgh0w3S4Q».*
(Continued)

*Primary Examiner* — Jasson Yoo
(74) *Attorney, Agent, or Firm* — Nixon & Vanderhye P.C.

(57) ABSTRACT

A game apparatus as a video reproduction controlling apparatus includes a CPU, and the CPU executes a reproduction control of a DVD. In the middle of reproducing the DVD, a content such as an video, a voice, etc. are reproduced. In a case that a reproduction operation such as pause, reproduction, fast reverse, fast forward, heading, etc. is not prohibited, in response to an instruction of the reproduced screen displayed on the monitor with a controller, an operation panel for reproduction operation is displayed. On the other hand, while a menu is reproduced or in a case that a screen button is displayed in accordance with the reproduction, the reproduction operation is prohibited, and even if the reproduced screen is instructed with the controller, the operation panel is not displayed.

32 Claims, 16 Drawing Sheets

(51) Int. Cl.

| | | |
|---|---|---|
| *G11B 27/10* | (2006.01) | |
| *H04N 21/422* | (2011.01) | |
| *H04N 21/431* | (2011.01) | |
| *H04N 21/432* | (2011.01) | |
| *H04N 5/44* | (2011.01) | |
| *H04N 5/765* | (2006.01) | |
| *H04N 5/775* | (2006.01) | |
| *H04N 5/907* | (2006.01) | |
| *H04N 9/806* | (2006.01) | |
| *H04N 9/82* | (2006.01) | |
| *H04N 21/426* | (2011.01) | |
| *H04N 21/472* | (2011.01) | |
| *H04N 21/478* | (2011.01) | |

(52) U.S. Cl.
CPC ... *H04N 21/42204* (2013.01); *H04N 21/4312* (2013.01); *H04N 21/4325* (2013.01); *G11B 2220/2562* (2013.01); *H04N 5/4403* (2013.01); *H04N 5/765* (2013.01); *H04N 5/775* (2013.01); *H04N 5/907* (2013.01); *H04N 9/8063* (2013.01); *H04N 9/8205* (2013.01); *H04N 21/42222* (2013.01); *H04N 21/42646* (2013.01); *H04N 21/4781* (2013.01); *H04N 21/47217* (2013.01)

(58) Field of Classification Search
CPC ...... H04N 5/775; H04N 5/4403; H04N 5/765; H04N 5/907; H04N 21/42204; H04N 21/4325; H04N 21/4312; H04N 21/47217; H04N 21/4781; H04N 21/42222; H04N 21/42646; H04N 9/8205; H04N 9/8063; G11B 19/025; G11B 27/105; G11B 2220/2562
USPC .......................................................... 463/31
See application file for complete search history.

(56) References Cited

U.S. PATENT DOCUMENTS

| | | | | |
|---|---|---|---|---|
| 6,402,619 | B1* | 6/2002 | Sato | A63F 13/005 |
| | | | | 463/23 |
| 6,699,127 | B1* | 3/2004 | Lobb et al. | 463/43 |
| RE39,830 | E* | 9/2007 | Balabanovic | G06F 3/0481 |
| | | | | 345/419 |
| 8,170,394 | B2 | 5/2012 | Machida et al. | |
| 8,243,017 | B2* | 8/2012 | Brodersen | G06F 3/0482 |
| | | | | 345/158 |
| 2001/0049301 | A1* | 12/2001 | Masuda | A63F 13/10 |
| | | | | 463/33 |
| 2002/0149590 | A1* | 10/2002 | Townsend | A63F 13/10 |
| | | | | 345/473 |
| 2003/0161615 | A1* | 8/2003 | Tsumagari | G11B 19/025 |
| | | | | 386/230 |
| 2003/0190951 | A1* | 10/2003 | Matsumoto | A63F 13/10 |
| | | | | 463/30 |
| 2003/0214488 | A1* | 11/2003 | Katoh | 345/173 |
| 2004/0176165 | A1* | 9/2004 | Takahashi | A63F 13/10 |
| | | | | 463/36 |
| 2004/0190865 | A1* | 9/2004 | Nomura | G11B 27/034 |
| | | | | 386/290 |
| 2005/0020359 | A1* | 1/2005 | Ackley | A63F 13/10 |
| | | | | 463/31 |
| 2005/0091597 | A1* | 4/2005 | Ackley | G11B 19/025 |
| | | | | 715/716 |
| 2005/0146534 | A1* | 7/2005 | Fong et al. | 345/619 |
| 2006/0148571 | A1* | 7/2006 | Hossack | A63F 13/10 |
| | | | | 463/43 |
| 2007/0003220 | A1* | 1/2007 | Hamasaka | G11B 20/10 |
| | | | | 386/219 |
| 2007/0047920 | A1* | 3/2007 | Machida | G06F 3/0481 |
| | | | | 386/231 |
| 2007/0099684 | A1* | 5/2007 | Butterworth | G11B 27/034 |
| | | | | 463/1 |
| 2007/0113200 | A1* | 5/2007 | Schipper | H04N 5/44582 |
| | | | | 715/810 |
| 2007/0276852 | A1* | 11/2007 | Fletcher | G06F 17/30038 |
| 2008/0119286 | A1* | 5/2008 | Brunstetter | A63F 13/00 |
| | | | | 463/43 |
| 2009/0132935 | A1* | 5/2009 | Van Zwol | G06F 17/30817 |
| | | | | 715/756 |
| 2009/0149252 | A1* | 6/2009 | Sato | G11B 19/025 |
| | | | | 463/31 |
| 2009/0217171 | A1* | 8/2009 | Hamilton, II | G06Q 30/02 |
| | | | | 715/736 |

OTHER PUBLICATIONS

"Road Blaster", Wikipedia.com, retrieved from: «https://en.wikipedia.org/wiki/Road_Blaster».*

"Dragon's Lair 2 Time Warp Full Game", YouTube.com, retrieved from:«https://www.youtube.com/watch?v=HzCJ5XInUqA».*

"Dragon's Lair II: Time Warp", wikipedia.org, retrieved from: «https://en.wikipedia.org/wiki/Dragon%27s_Lair_II:_Time_Warp».*

Office Action dated Oct. 16, 2012 in corresponding Japanese Application No. 2007-314490.

\* cited by examiner

FIG. 8
(A) MENU SCREEN 100
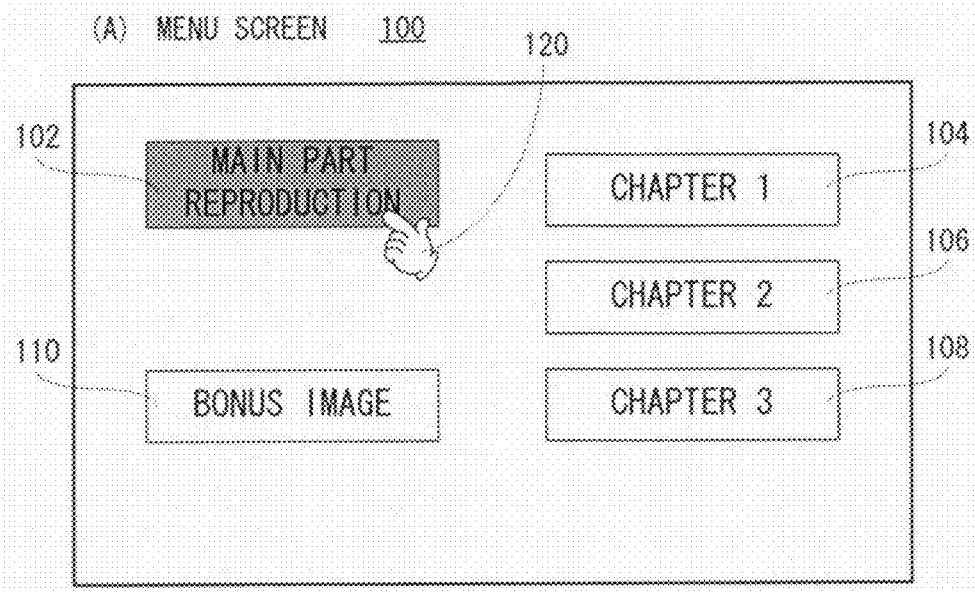
(B) REPRODUCED SCREEN 200
(THERE IS AN OPERATION PANEL)
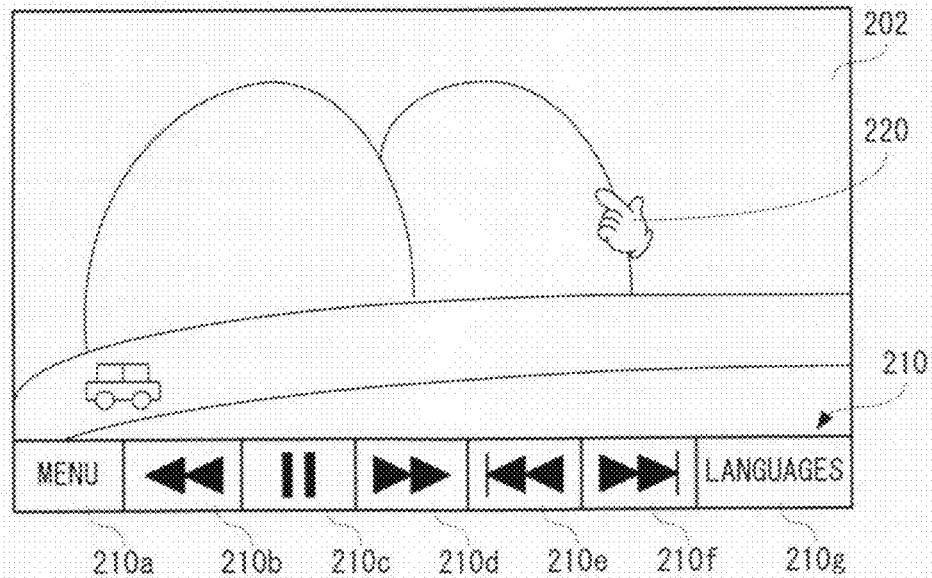

FIG. 9
(A) REPRODUCED SCREEN 300
(THERE IS A SCREEN BUTTON)
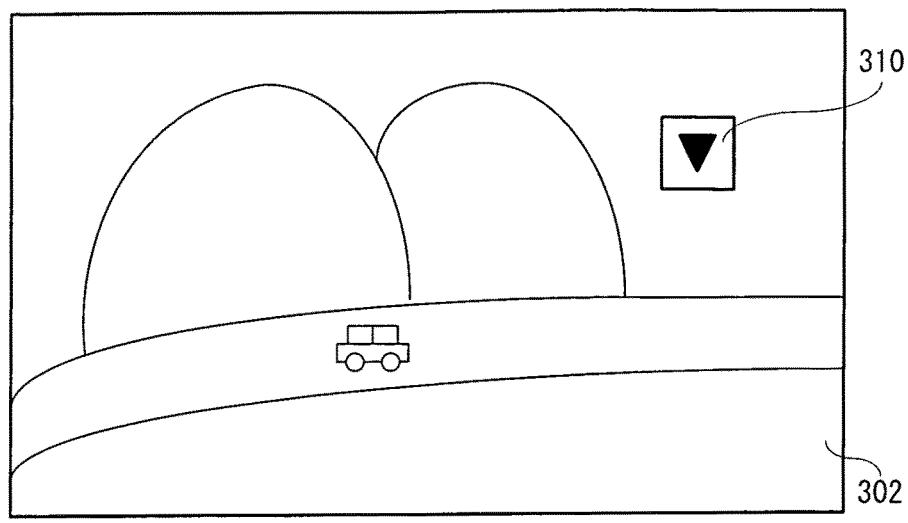
(B) REPRODUCED SCREEN 400
(THERE IS NO OPERATION PANEL AND SCREEN BUTTON)
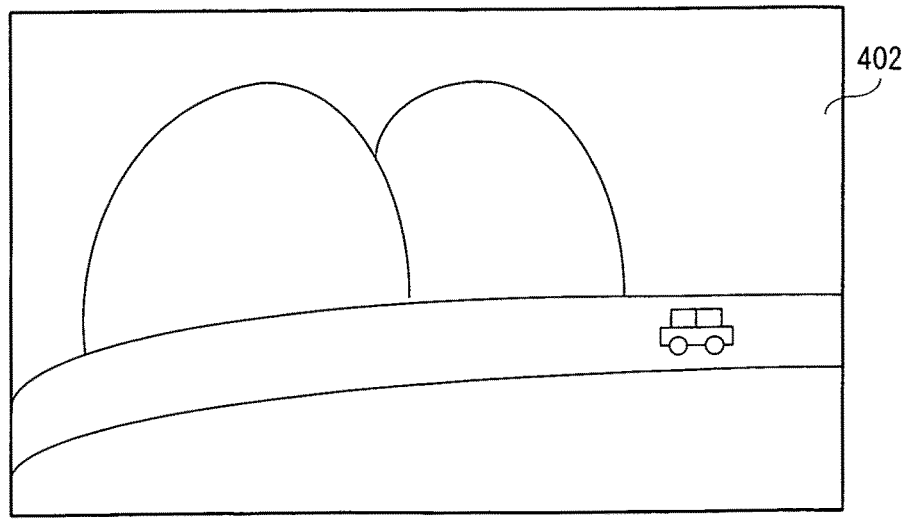

FIG. 10

(A) MENU

| CONTROL INFORMATION | VIDEO INFORMATION | SOUND INFORMATION | .... | COMMAND INFORMATION |

(B) MAIN PART (ANYTHING OTHER THAN MENU)

| CONTROL INFORMATION | VIDEO INFORMATION | SOUND INFORMATION | .... | COMMAND INFORMATION |

STORAGE MEDIUM STORING A VIDEO REPRODUCTION CONTROLLING PROGRAM, VIDEO REPRODUCTION CONTROLLING APPARATUS AND VIDEO REPRODUCTION CONTROLLING METHOD

CROSS REFERENCE OF RELATED APPLICATION

The disclosure of Japanese Patent Application No. 2007-314490 is incorporated herein by reference.

TECHNICAL FIELD

Certain exemplary embodiments relate to a storage medium storing a video reproduction controlling program, a video reproduction controlling apparatus, and a video reproduction controlling method. More specifically, certain exemplary embodiments relate to a storage medium storing a video reproduction controlling program, a video reproduction controlling apparatus, and a video reproduction controlling method that reproduce a video content.

BACKGROUND AND SUMMARY

As one example of a video reproduction controlling apparatus of such a kind, there is an information processing apparatus such as a computer installing a piece of software (application) for reproducing a content like a video, music, etc. recorded in a recording medium like a DVD, such as Microsoft Windows Media Player II for Windows XP. In this application, an operation required when a content like a video, music, etc. recorded in the recording medium like a DVD, etc. ("reproduction", "fast reverse", "fast forward", "heading", etc.) is reproduced ("reproduction", "fast reverse", "fast forward", "heading", etc.) is executed by operating an operation panel displayed on a display portion of the information processing apparatus by utilizing an input device such as a computer mouse, or the like connected to the information processing apparatus. Here, the operation panel includes a plurality of operation buttons (icons) each of which is assigned a function as to an operation required for reproducing the content. If an operation input from the input device connected to the information processing apparatus is not performed for a predetermined time, the operation panel is automatically erased (non-displayed) from the display portion, and the operation panel is displayed again when a next operation input is performed from the input device. Furthermore, the input device is utilized also with respect to an input as to an operation instruction (menu selection, etc.) within a content like a video, music, etc. recorded in the recording medium like a DVD.

However, in the conventional information processing apparatus, depending on whether or not an operation input is performed from the input device, a display control of the operation panel is performed on the display portion of the information processing apparatus. That is, when there is an operation input from the input device, by determining that an operation input is performed, an operation panel for performing an operation input required when a content like a video, a music, etc. recorded in the recording medium like a DVD is reproduced is displayed on the display portion. When an operation input from the input device is not performed for a predetermined time, by determining that an operation input is not performed, the operation panel is erased. However, it is considered that a condition that whether or not there is an operation input from the input device is not necessarily equal to the condition whether or not the operation panel is required.

For example, in a case that an input operation as to an operation instruction (menu selection, etc.) is performed in the content like a video, music, etc. recorded in the recording medium like a DVD, an operation input by the operation panel is basically not required, but each button image of the operation panel is brought into correspondence with each operation instruction in the content, and therefore, the user has his or her doubts about which button or button image is to be selected, the button (screen button) on the screen separately provided for operation instruction within the content and the button image provided to the operation panel, and which button image is brought into correspondence with which operation instruction within the content. This results in a complicated operation. In addition, even when an operation input is invalidated (not required) like reproducing a menu of a DVD, if there is an operation input from the input device, the operation panel is displayed, so that display areas for other information required to be displayed are constrained by the display area of the operation panel ensured in the display portion of the information processing apparatus.

Therefore, it is a feature of certain exemplary embodiments to provide a novel storage medium storing a video reproduction controlling program, video reproduction controlling apparatus, and video reproduction controlling method.

Another feature of the certain exemplary embodiments is to provide a storage medium storing a video reproduction controlling program, a video reproduction controlling apparatus and a video reproduction controlling method capable of enhancing operability, and efficiently utilizing a display area.

Certain exemplary embodiments employ the following features in order to solve the above-described problems. It should be noted that reference numerals inside the parentheses and supplemental remarks show one example of a corresponding relationship with the embodiments described later for easy understanding of the present invention, and do not limit the present invention.

A first exemplary embodiment is a storage medium storing a video reproduction controlling program for reproducing a video content with an information processing apparatus provided with an operating portion, and the reproduction controlling program causes a computer of the information processing apparatus to function as a video content reproducing means, an operation instruction requesting means, an operation instruction determining means, and an operation panel displaying means. The video content reproducing means reproduces a video content. The operation instruction requesting means requests an input from the operating portion at predetermined timing according to the reproduction by the video content reproducing means. The operation instruction determining means determines whether or not the operation instruction requesting means requests an input from the operating portion. The operation panel displaying means displays an operation panel for making a reproduction operation of at least the video content when the operation instruction determining means determines that an input from the operating portion is not requested.

In the first exemplary embodiment, an information processing apparatus (12) has an operating portion (22, 26), and a video reproduction controlling program causes a computer of the information processing apparatus to function as a video content reproducing means (40, S3), an operation instruction requesting means (40, S3), an operation instruction determining means (40, S5), and an operation panel displaying means (40, S13). The video content reproducing means reproduces a video content. For example, the video content is reproduced from a disk medium such as a DVD, reproduced from an internal memory stored by downloading, fetching from the external memory. The operation instruction requesting means requests an input from the operating portion at predetermined timing according to the reproduction by the video content reproducing means. For example, a button image (screen button) for requesting an operation is displayed at predetermined timing on the screen for displaying a video content. The operation instruction determining means determines whether or not the operation instruction requesting means requests an input from the operating portion. The operation panel displaying means displays an operation panel for making a reproduction operation (fast reverse, fast forward, pause, heading, etc.) of at least the video content when the operation instruction determining means determines that an input from the operating portion is not requested. For example, in a case that a screen button is not displayed, the operation panel is displayed.

According to the first exemplary embodiment, while a video content is being reproduced, and in a case that an input from the operating portion is not requested according to the reproduction of the video content, the operation panel is displayed, so that it is possible to display the operation panel only when a need arises. Thus, it is possible to improve operability. Furthermore, a useless display of the operation panel does not occur, capable of efficiently utilizing the display area.

A second exemplary embodiment is dependent on the first exemplary embodiment, and the video reproduction controlling program causes the computer to further function as a video content determining means for determining that the video content which is being reproduced by the video content reproducing means is anything other than a menu within the video content, and the operation panel displaying means displays the operation panel in a case that the video content determining means determines that the video content is anything other than the menu.

In the second exemplary embodiments, the video reproduction controlling program causes a computer of an information processing apparatus to further function as a video content determining means (40, S9). The video content determining means determines that the video content which is being reproduced by the video content reproducing means is anything other than a menu within the video content. For example, it is determined whether a menu or a main part. The operation panel displaying means displays the operation panel in a case that the video content determining means determines that the video content is anything other than the menu of the video content. Conversely, while the menu is being reproduced, the operation panel is not displayed. This is because that a reproduction operation of a video content is not required in the middle of reproducing the menu, and such reproduction operation is generally prohibited.

According to the second exemplary embodiment, in a case that a reproduction operation is not needed like in the middle of reproducing the menu, the operation panel is not displayed, and therefore, it is possible to display the operation panel only when a need arises.

A third exemplary embodiment is dependent on the first exemplar embodiment, and the video reproduction controlling program causes the computer to further function as an input detecting means for detecting an input from the operating portion, and an executing means for executing processing according to the input detected by the input detecting means. The executing means executes different processing between a first mode allowing an input in response to a request from the operation instruction requesting means and a second mode allowing an input similar to the operation panel.

In the third exemplary embodiment, the video reproduction controlling program causes a computer of the information processing apparatus to further execute an input detecting means (40, S15, S27) and an executing means (40, S19, S25, S31, S37, S43, S51, S53). The input detecting means detects an input from the operating portion. The executing means executes processing according to the input detected by the input detecting means. The executing means executes different processing between a first mode ("YES" in a step S5) allowing an input in response to a request from the operation instruction requesting means and a second mode ("NO" in the step S5) allowing an input similar to the operation panel. For example, a cross key is used for instructing a direction in the first mode, and used for instructing a reproduction operation assigned to the respective directions in the second mode.

According to the third exemplary embodiment, since different commands can be input by utilizing one operating portion, this is superior in operability to a case that a plurality of operating portions are used to perform different commands.

A fourth exemplary embodiment is dependent on the first exemplary embodiment, and the video content includes video information and control information for performing a control at a time of reproducing the video information in an one-to-one correspondence, the operation instruction requesting means requests an input from the operating portion according to the control information being brought into correspondence with the video information which is being currently reproduced, and the operation instruction determining means determines whether or not an input from the operating portion is requested according to the control information being brought into correspondence with the video information which is being currently reproduced.

In the fourth exemplary embodiment, in the video content, video information and control information for performing a control at a time of reproducing the video information are included in a one-to-one correspondence. Accordingly, the operation instruction requesting means requests an input from the operating portion according to the control information being brought into correspondence with the video information which is being currently reproduced. Furthermore, the operation instruction determining means determines whether or not an input from the operating portion is requested according to the control information being brought into correspondence with the video information which is being currently reproduced.

According to the fourth exemplary embodiment, video information and its control information are included in the video content in a one-to-one correspondence, and therefore, it is possible to easily determine whether or not an input from the operating portion is requested.

A fifth exemplary embodiment is a storage medium storing a video reproduction controlling program for reproducing a video content with an information processing apparatus provided with an operating portion. The video reproduction controlling program causes a computer of the information processing apparatus to function as a video content reproducing means, a video content determining means, and an operation panel displaying means. The video content reproducing means reproduces a video content. The video content determining means determines whether or not the video content to be reproduced by the video content reproducing means is anything other than a menu in the video content. The operation panel displaying means displays an operation panel for making a reproduction operation of at least the video content in a case that the video content determining means determines that the video content is anything other than the menu.

In the fifth exemplary embodiment, an information processing apparatus (12) is provided with an operating portion (22, 26), and a video reproduction controlling program causes a computer of the information processing apparatus to function as a video content reproducing means (40, S3), a video content determining means (40, S9), and an operation panel displaying means (40, S13). The video content reproducing means reproduces a video content. The video content determining means determines whether or not the video content to be reproduced by the video content reproducing means is anything other than a menu in the video content. The operation panel displaying means displays an operation panel for making a reproduction operation of at least the video content in a case that the video content determining means determines that the video content is anything other than the menu.

In also the fifth exemplary embodiment, similar to the second exemplary embodiment, in a case that a reproduction operation is not needed like in the middle of reproducing the menu, the operation panel is not displayed, and therefore, it is possible to display the operation panel only when a need arises.

A sixth exemplary embodiment is dependent on the fifth exemplary embodiment, and the video reproduction controlling program causes the computer to further function as an input detecting means for detecting an input from the operating portion, an executing means for executing processing according to the input detected by the input detecting means, and an invalidating means for invalidating the input as to the reproduction operation of the video content detected by the input detecting means in a case that the video content determining means determines that the video content is a menu.

In the sixth exemplary embodiment, the video reproduction controlling program causes a computer of the information processing apparatus to further function as an input detecting means (40, S15, S27), an executing means (40, S19, S25, S31, S37, S43, S51, S53) and an invalidating means (40, S21). The input detecting means detects an input from the operating portion. The executing means executes processing according to the input detected by the input detecting means. The invalidating means invalidates the input as to the reproduction operation of the video content detected by the input detecting means ("NO" in a step S21) in a case that the video content determining means determines that the video content is a menu ("YES" in a step S9).

According to the sixth exemplary embodiment, in the middle of reproducing the menu, a reproduction operation of a video content is invalidated. Thus, it is possible to inform that the reproduction operation is impossible not only by not displaying the operation panel, but also by invalidating the reproduction operation.

A seventh exemplary embodiment is dependent on the fifth exemplary embodiment, and the video content is made up of a plurality of kinds of data including a plurality of kinds of information, and each data is assigned an identifier for identifying the respective kinds, and the video content determining means determines according to the identifier assigned to the data which is being reproduced whether or not the data is anything other than a menu in the video content.

In the seventh exemplary embodiment, the video content is made up of a plurality of kinds of data including a plurality of kinds of information. For example, the video content includes a menu and anything other than the menu (main part, bonus video, etc.). Each data is assigned an identifier such as a header information, label, etc. for identifying the respective kinds. Accordingly, the video content determining means determines according to the identifier assigned to the data which is being reproduced whether or not the data is anything other than a menu in the video content.

According to the seventh exemplar embodiment, it is possible to easily identify the kind of the video content on the basis of the identifier.

An eighth exemplary embodiment is dependent on the first exemplary embodiment or the fifth exemplary embodiment, and the video reproduction controlling program causes the computer to further function as an input determining means for determining a presence or absence of an input from the operating portion, and the operation panel displaying means displays the operation panel when the input determining means determines that there is an input.

In the eighth exemplary embodiment, the video reproduction controlling program causes a computer of the information processing apparatus to further execute an input determining means (40, S11). The operation panel displaying means displays the operation panel when the input determining means determines that there is an input ("YES" in a step S11).

According to the eighth exemplary embodiment, in a case that the input determining means determines that there is an input, the operation panel is displayed, so that when there is a possibility of actually making a reproduction operation, the operation panel can be displayed.

A ninth exemplary embodiment is dependent on the eighth exemplary embodiment, wherein the operating portion is a pointing device, and the input determining means determines a presence or absence of an input from the pointing device.

In the ninth exemplary embodiment, the operating portion is a pointing device, for example. Accordingly, the input determining means determines a presence or absence of an input from the pointing device. More specifically, it is determined whether or not a position on the screen is instructed by the pointing device.

In the ninth exemplary embodiment, use of the pointing device makes the operation easy.

A tenth exemplary embodiment is dependent on the ninth exemplary embodiment, and the video content includes screen button information including at least display timing of a screen button to be displayed, and the operation instruction requesting means includes an instruction request outputting means for displaying the screen button according to the display timing included in the screen button information, the instruction request outputting means requests an input from the operating portion by displaying the screen button, and the operation instruction determining means determines whether or not an input from the operating portion is requested depending on whether or not the screen button is displayed according to the display timing included in the screen button information. The video reproduction controlling program causes the computer to further function as a pointing instruction determining means for determining whether or not the screen button is instructed by the pointing device according to the screen button information in a case that the input determining means determines that there is an input form the pointing device.

In the tenth exemplary embodiment, the video content includes screen button information including at least display timing of a screen button (310) to be displayed. An instruction request outputting means (40, S3) of the operation instruction requesting means displays the screen button according to the display timing included in the screen button information. Thus, by displaying the screen button by the instruction request outputting means, an input from the operating portion is requested. Accordingly, the operation instruction determining means determines whether or not an input from the operating portion is requested depending on whether or not the screen button is displayed according to the display timing included in the screen button information. The video reproduction controlling program causes the computer to further function as a pointing instruction determining means (40, S23, S49). The pointing instruction determining means determines whether or not the screen button is instructed by the pointing device according to the screen button information in a case that the input determining means determines that there is an input form the pointing device ("YES" in step S15, S27).

According to the tenth exemplary embodiment, by displaying the screen button, an input from the operating portion is requested, so that it is possible to easily inform the user of a request of an input from the operating portion.

An eleventh exemplary embodiment is dependent on the tenth exemplary embodiment, and the screen button information further includes image information and displayed coordinate information of the screen button.

In the eleventh exemplary embodiment, the screen button information further includes image information (image data, etc.) of the screen button and the displayed coordinate information (coordinate data, etc.) thereof.

According to the eleventh exemplary embodiment, the screen button information includes image information and a displayed position coordinate of the screen button, and therefore it is possible to easily display the screen button.

A twelfth exemplary embodiment is dependent on the ninth exemplary embodiment, and the input determining means includes a valid input determining means for determining whether a valid input or not in the video reproduction controlling program when there is an input from the pointing device, and the operation panel displaying means displays the operation panel in a case that the video content determining means determines that the video content is anything other than the menu, and when the valid input determining means determines to be a valid input in the video reproduction controlling program.

In the twelfth exemplary embodiment, a valid input determining means (40, S11) of the input determining means determines whether a valid input or not in the video reproduction controlling program when there is an input from the pointing device. For example, in a case that the instructed position by the pointing device is within the screen, it is determined that this is a valid input ("YES" in step S11), and in a case that the instructed position is not within the screen, it is determined that this is an invalid input ("NO" in the step S11). Accordingly, the operation panel displaying means displays the operation panel in a case that the video content is anything other than the menu, and the input is a valid input.

According to the twelfth exemplary embodiment, it is possible to display the operation panel only when a need arises such as a case that an input by the pointing device is valid.

A thirteenth exemplary embodiment is dependent on the first exemplary embodiment or the fifth exemplary embodiment, the video content reproducing means reproduces a video content stored in an optical disk.

In the thirteenth exemplary embodiment, the video content reproducing means reproduces a video content stored in an optical disk like a DVD, for example. It should be noted that a video content downloaded or fetched from another external memory may be reproduced.

According to the thirteenth exemplary embodiment, since the video content stored in the optical disk is reproduced, existing disk devices can be employed, thereby possibly reducing development cost.

A fourteenth exemplary embodiment is dependent on the first exemplary embodiment, and the video content includes screen button information including at least display timing of a screen button to be displayed, the operation instruction requesting means includes an instruction request outputting means for displaying the screen button according to the display timing included in the screen button information, and the instruction request outputting means requests an input from the operating portion by displaying the screen button, the operation instruction determining means determines whether or not an input from the operating portion is requested depending on whether or not the screen button is displayed according to the display timing included in the screen button information.

In the fourteenth exemplary embodiment, the video content includes screen button information including at least display timing of a screen button to be displayed. Accordingly, the instruction request outputting means (40, S3) of the operation instruction requesting means displays the screen button according to the display timing included in the screen button information. Thus, by displaying the screen button by the instruction request outputting means, an input from the operating portion is requested. Thus, the operation instruction determining means determines whether or not an input from the operating portion is requested depending on whether or not the screen button is displayed according to the display timing included in the screen button information.

According to the fourteenth exemplary embodiment, merely according to the button information, the screen button is displayed, an input from the operating portion is requested, and so forth, making the control easy.

A fifteenth exemplary embodiment is dependent on the fourteenth exemplary embodiment, and the screen button information further includes image information and displayed coordinate information of the screen button.

In the fifteenth exemplary embodiment, the screen button information further includes image information and displayed coordinate information of the screen button. That is, the screen button is displayed by means of the image information and the displayed coordinates, and the presence or absence of the operation of the screen button is determined on the basis of the displayed coordinates.

According to the fifteenth exemplary embodiment, according to the screen button information, the button image is displayed, the presence or absence of an operation of the button is determined, and so forth. Thus, it is possible to perform a display control and determination processing as to the presence or absence of the operation by easy coordinates calculation.

A sixteenth exemplary embodiment is a video reproduction controlling apparatus which has an operating portion and reproduces a video content, and the video reproduction controlling apparatus comprises a video content reproducing means, an operation instruction requesting means, an operation instruction determining means, and an operation panel displaying means. The video content reproducing means reproduces a video content. The operation instruction requesting means requests an input from the operating portion at predetermined timing according to the reproduction by the video content reproducing means. The operation instruction determining means determines whether or not the operation instruction requesting means requests an input from the operating portion. The operation panel displaying means displays an operation panel for making a reproduction operation of at least the video content when the operation instruction determining means determines that an input from the operating portion is not requested.

In also the sixteenth exemplary embodiment, similar to the first exemplary embodiment, it is possible to improve operability.

A seventeenth exemplary embodiment is a video reproduction controlling apparatus which has an operating portion and reproduces a video content, and the video reproduction controlling apparatus comprises a video content reproducing means, a video content determining means, and an operation panel displaying means. The video content reproducing means reproduces a video content. The video content determining means determines whether or not the video content to be reproduced by the video content reproducing means is anything other than a menu in the video content. The operation panel displaying means displays an operation panel to make a reproduction operation of at least the video content in a case that the video content determining means determines that the video content is anything other than the menu.

In also the seventeenth exemplary embodiment, similar to the fifth exemplary embodiment, it is possible to improve the operability.

An eighteenth exemplary embodiment is a video reproduction controlling method of a video reproduction controlling apparatus which has an operating portion and reproduces a video content, and includes following steps of: (a) reproducing the video content, (b) requesting an input from the operating portion at predetermined timing according to the reproduction by the step (a), (c) determining whether or not the step (b) requests an input from the operating portion, and (d) displaying an operation panel for making a reproduction operation of at least the video content in a case that the step (c) determines that an input from the operating portion is not required.

In also the eighteenth exemplary embodiment, similar to the first exemplary embodiment, it is possible to improve the operability.

A nineteenth exemplary embodiment is a video reproduction controlling method of a video reproduction controlling apparatus which has an operating portion and reproduces a video content, and includes following steps of: (a) reproducing the video content, (b) determining whether or not the video content to be reproduced by the step (a) is anything other than a menu in the video content, and (c) displaying an operation panel for making a reproduction operation of at least the video content in a case that the step (b) determines that the video content is anything other than the menu.

In also the nineteenth exemplary embodiment, similar to the fifth exemplary embodiment, it is possible to improve the operability.

The above described features, aspects and advantages of the certain exemplary embodiments will become more apparent from the following detailed description of when taken in conjunction with the accompanying drawings.

BRIEF DESCRIPTION OF THE DRAWINGS

FIG. 8 is an illustrative view showing examples of a menu screen and a reproduced screen to be displayed on the monitor shown in FIG. 1;

FIG. 9 is an illustrative view showing another example of the reproduced screen to be displayed on the monitor shown in FIG. 1;

FIG. 10 is an illustrative view showing data structure of content data to be reproduced in the game apparatus shown in FIG. 1;

DETAILED DESCRIPTION OF THE CERTAIN EXEMPLARY EMBODIMENTS

Figure 1:
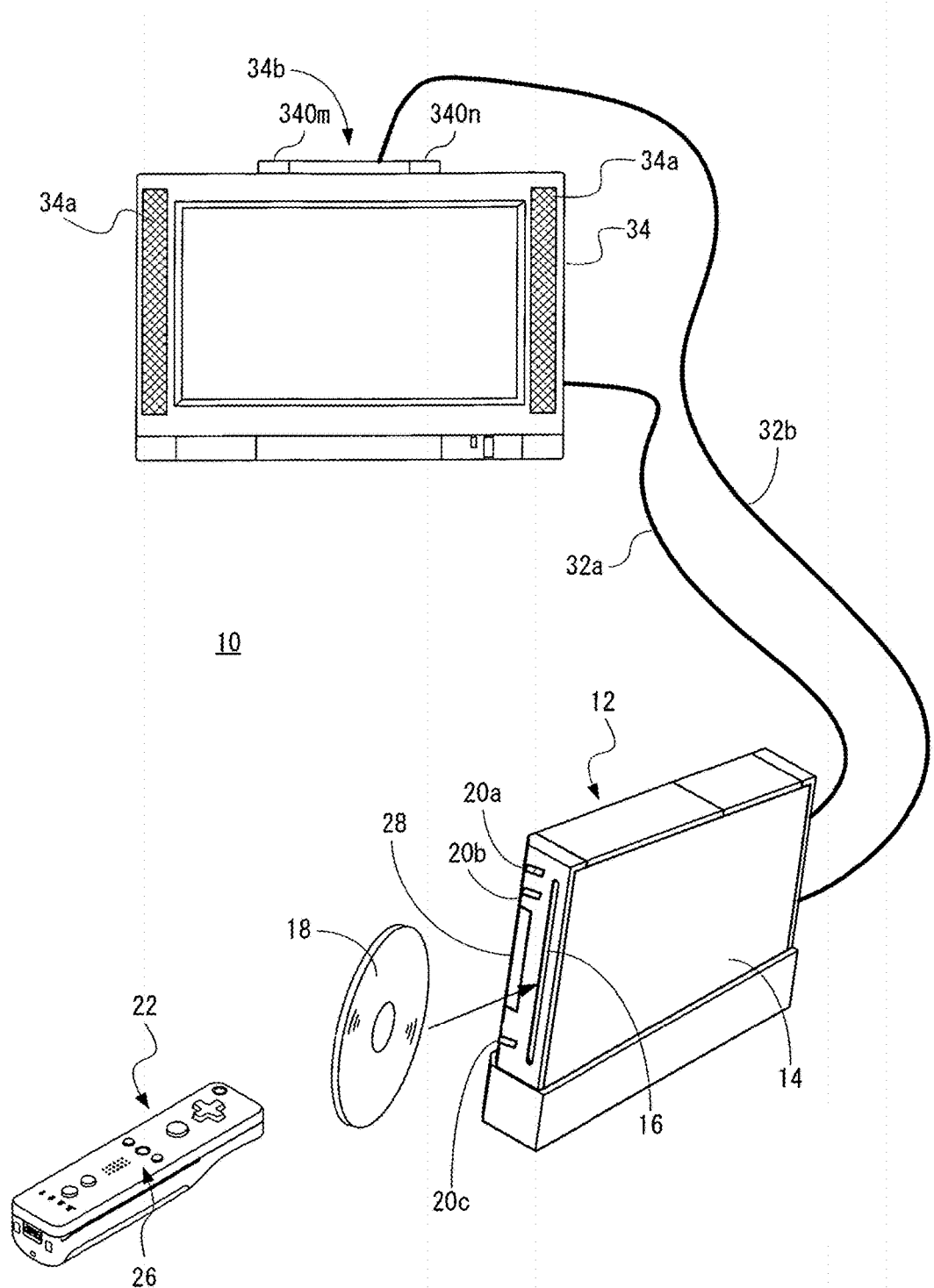
FIG. 1 is an illustrative view showing one embodiment of a game system of this invention.

Referring to FIG. 1, a game system 10 of one embodiment of the present invention includes a video game apparatus (hereinafter referred to as "game apparatus") 12 functioning as an information processing apparatus and a controller 22. Although illustration is omitted, the game apparatus 12 of this embodiment is designed such that it can be connected to four controllers 22 at the maximum. Furthermore, the game apparatus 12 and the respective controllers 22 are connected by radio. The wireless communication is executed according to a Bluetooth (registered trademark) standard, for example, but may be executed by other standards such as infrared rays, a wireless LAN. In addition, it may be connected by a wire.

The game apparatus 12 includes a roughly rectangular parallelepiped housing 14, and the housing 14 is furnished with a disk slot 16 on a front surface. An optical disk 18 as one example of an information storage medium storing game program, etc. is inserted from the disk slot 16 to be loaded into a disk drive 54 (see FIG. 2) within the housing 14. Although illustration is omitted, around the disk slot 16, an LED and a light guide plate are arranged such that the LED of the disk slot 16 lights on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an external connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory. In addition, in the game apparatus 12, other application except for the game may be executed, and in such a case, data of the other application can be stored in the memory card.

Here, a general-purpose SD card can be employed as a memory card, but other general-purpose memory cards, such as memory sticks, multimedia cards (registered trademark) can be employed.

Although omitted in FIG. 1, the game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a typically are a color television receiver, and through the AV cable 32a, a video signal from the game apparatus 12 is input to a video input terminal of the color television, and a sound signal is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 34m and 34n is provided. The marker unit 34b is connected to the game apparatus 12 through a power source cable 32b. Accordingly, the marker unit 34b is supplied with power from the game apparatus 12. Thus, the markers 34m and 34n emit lights toward front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or the downloaded program may be installed onto the internal memory.

Furthermore, in a case that a DVD recording a content like a video, a voice as an optical disk 18 is loaded into the disk drive 54 of the game apparatus 12, the content stored in the DVD can be reproduced. For example, when the content stored in the DVD is reproduced, a menu screen for selecting details to be reproduced is displayed. In the middle of displaying the menu screen, by swinging (moving) the controller 22 to thereby moving an instruction image like a cursor or a mouse pointer displayed on the menu screen, a desired item (button image or icon) is selected. When any of the operating means 26 is operated with the desired item selected, a reproduction instruction of the content can be input according to the selected desired item.

For example, a main part of the content is reproduced from a top, a designated chapter in the content is reproduced, a bonus video of the content is reproduced, and so forth. During reproducing the main part, by moving the controller 22 to thereby select (designate) button images or icons of the operation panel displayed on the reproduced screen (see FIG. 8(B)), it is possible to perform operations in relation to reproduction (hereinafter referred to as "reproduction operation") such as, pause (reproduction), fast forward, fast reverse, skipping (heading) a chapter (program). In such a case, the controller 22 functions as a so-called pointing device (first mode). Furthermore, a reproduction operation is previously assigned, as a function, to a part of the operating means 26 of the controller 22, and by operating the relevant operating means 26, it is possible to perform a reproduction operation also. In such a case, the controller 22 functions as a remote controller of the game apparatus 12 which functions as a DVD player (second mode).

In general, while a DVD is reproduced to display a menu screen, the aforementioned reproduction operation is prohibited. Thus, in this embodiment, in a case that a menu screen of the DVD is displayed, even if there is an operation input as to a reproduction operation from the controller 22, the operation input is invalidated.

Although a detailed description is omitted, selection among processing such as playing a game with the game apparatus 12, executing another application other than the game, reproducing a DVD and so forth can be performed on a menu screen (different from the menu screen in the middle of reproducing a DVD) which is displayed at starting-up the game apparatus 12.

Figure 2:
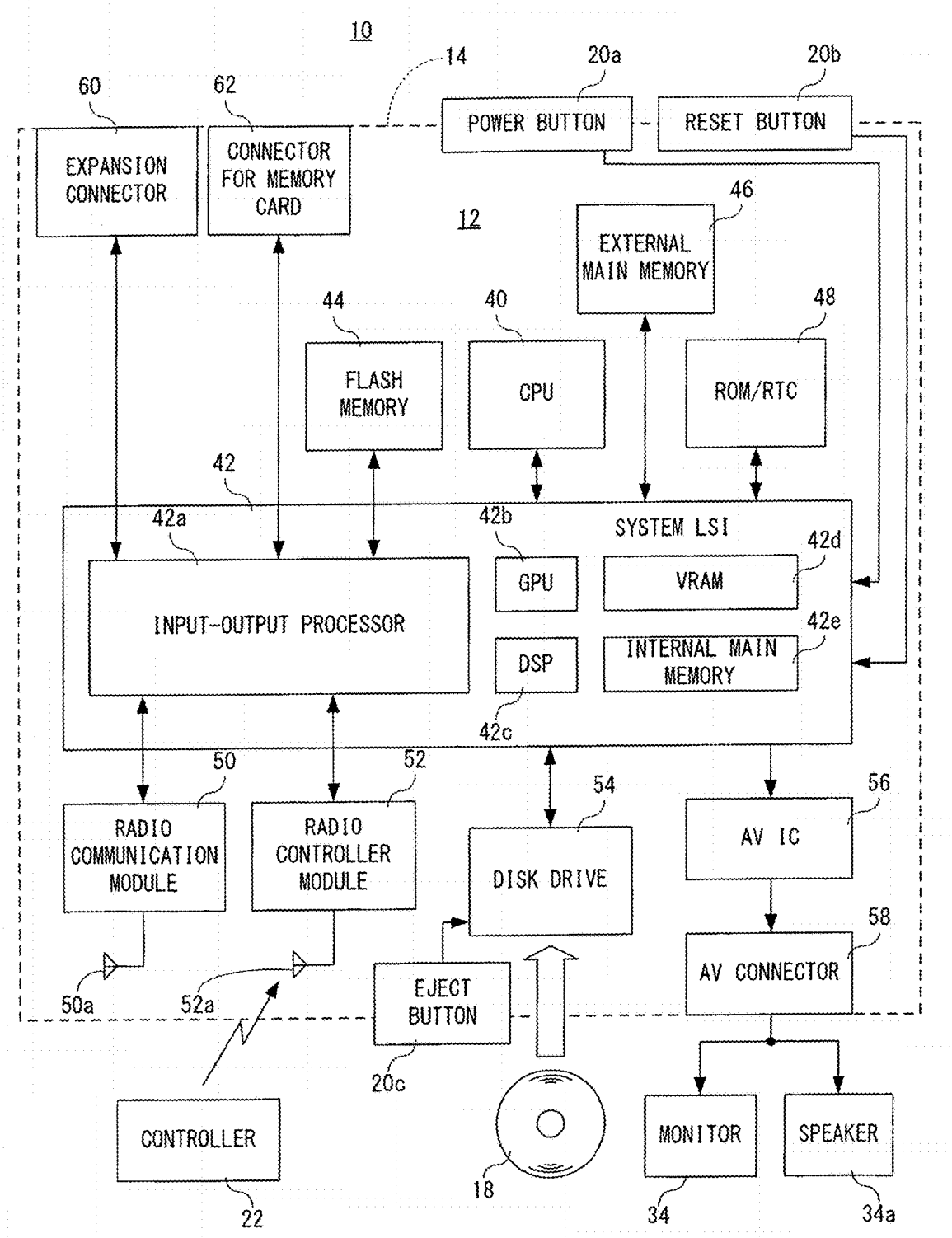
FIG. 2 is a block diagram showing an electric configuration of the game system shown in FIG. 1.

FIG. 2 is a block diagram of an electric configuration of the video game system 10 in FIG. 1 embodiment. Although illustration is omitted, the respective components within the housing 14 are contained on a printed board. As shown in FIG. 2, the game apparatus 12 has a CPU 40. The CPU 40 functions as a game processor. The CPU 40 is connected to a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc., various data. The ROM/RTC 48, the so-called boot ROM, is incorporated with a program for activating the game apparatus 12, and provided with a time circuit for counting a time. The disk drive 54 reads program, image data, sound data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e. These are connected with each other by internal buses although illustration is omitted. The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a radio communication module 50, a radio controller module 52, an expansion connector 60 and a connector for memory card 62. The radio communication module 50 is connected with an antenna 50a, and the radio controller module 52 is connected with an antenna 52a.

Although illustration is omitted, the input-output processor 42a can communicate with other game apparatuses and various servers to be connected to a network via the radio communication module 50. It should be noted that it is possible to directly communicate with other game apparatuses without going through the network. The input-output processor 42a periodically accesses the flash memory 44 to detect the presence or absence of data (referred to as transmission data) being required to be transmitted to a network, and, in a case that the transmission data is present, transmits it to the network via the radio communication module 50 and the antenna 50a. Furthermore, the input-output processor 42a receives data (referred to as reception data) transmitted from other game apparatuses via the network, the antenna 50a and the radio communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the radio communication module 50, and stores the download data in the flash memory 44.

Furthermore, the input-output processor 42a receives input data transmitted from the controller 22 via the antenna 52a and the radio controller module 52, and (temporarily) stores it in the buffer area of the internal main memory 42e or the external main memory 46. The input data is erased from the buffer area after being utilized in the processing by the CPU 40 (game processing, for example).

In this embodiment, as described above, the radio controller module 52 performs communication with the controller 22 in accordance with Bluetooth standards.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the radio communication module 50. The connector for memory card 62 can be connected with an external storage like a memory card. Thus, for example, the input-output processor 42a accesses the external storage via the expansion connector 60 and the connector for memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 set in a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the radio communication module 50, and the radio controller module 52. Accordingly, in this embodiment, in the standby mode, the CPU 40 never performs an application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20*a* is turned off, the power supply to all the circuit components are completely stopped.

Furthermore, switching between the normal mode and the standby mode can be performed by turning on and off the power switch 26*h* of the controller 22 by remote control. If the remote control is not performed, setting is made such that the power supply to the radio controller module 52*a* is not performed in the standby mode.

The reset button 20*b* is also connected with the system LSI 42. When the reset button 20*b* is pushed, the system LSI 42 restarts the activation program of the game apparatus 12. The eject button 20*c* is connected to the disk drive 54. When the eject button 20*c* is pushed, the optical disk 18 is removed from the disk drive 54.

Each of FIG. 3(A) to FIG. 3(E) shows one example of an external appearance of the controller 22. FIG. 3(A) shows a front end surface of the controller 22, FIG. 3(B) shows a top surface of the controller 22, FIG. 3(C) shows a right side surface of the controller 22, FIG. 3(D) shows a lower surface of the controller 22, and FIG. 3(E) shows a back end surface of the controller 22.

Referring to FIG. 3(A) and FIG. 3(E), the controller 22 has a housing 22*a* formed by plastic molding, for example. The housing 22*a* is formed into an approximately rectangular parallelepiped shape and has a size small enough to be held by one hand of a user. The housing 22*a* (controller 22) is provided with the input means (a plurality of buttons or switches) 26. Specifically, as shown in FIG. 3(B), on an upper face of the housing 22*a*, there are provided a cross key 26*a*, a 1 button 26*b*, a 2 button 26*c*, an A button 26*d*, a − button 26*e*, a HOME button 26*f*, a + button 26*g* and a power switch 26*h*. Moreover, as shown in FIG. 3(C) and FIG. 3(D), an inclined surface is formed on a lower surface of the housing 22*a*, and a B-trigger switch 26*i* is formed on the inclined surface.

The cross key 26*a* is a four directional push switch, including four directions of front (or upper), back (or lower), right and left operation parts. By operating any one of the operation parts, it is possible to instruct a moving direction of a character or object (player character or player object) that is operable by a player or instruct the moving direction of a cursor. In addition, in a case that a DVD is played in the game apparatus 12, and the controller 22 is used as a remote controller, with an operation of the left operating portion, it is possible to instruct fast reverse, and with an operation of the right operating portion, it is possible to instruct fast forward.

The 1 button 26*b* and the 2 button 26*c* are respectively push button switches, and are used for a game operation, such as adjusting a viewpoint position and a viewpoint direction on displaying the 3D game image, i.e. a position and an image angle of a virtual camera. Alternatively, the 1 button 26*b* and the 2 button 26*c* can be used for the same operation as that of the A-button 26*d* and the B-trigger switch 26*i* or an auxiliary operation.

The A-button switch 26*d* is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 22 uses as a pointing device, the A-button switch 26*d* is used to instruct a decision of an icon or a button image instructed by a pointer (instruction image) on the game screen. For example, when the icon or the button image is decided, an instruction or a command set in advance corresponding thereto can be input. In addition, in a case that a DVD is played by the game apparatus 12, and the controller 22 is used as a remote controller, the A button switch 26*d* can instruct reproduction or pause.

The − button 26*e*, the HOME button 26*f*, the + button 26*g*, and the power supply switch 26*h* are also push button switches. The − button 26*e* is used for selecting a game mode. The HOME button 26*f* is used for displaying a game menu (menu screen). The + button 26*g* is used for starting (re-starting) or pausing the game. The power supply switch 26*h* is used for turning on/off a power supply of the game apparatus 12 by remote control. Additionally, in a case that a DVD is played by the game apparatus 12, and the controller 22 is used as a remote controller, the − button 26*e* and the + button 26*g* are used to perform skipping (heading). More specifically, the − button 26*e* is used to reverse a chapter, and the + button 26*g* is used to forward a chapter.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26*i* is also the push button switch, and is mainly used for inputting a trigger such as shooting, and designating a position selected by the controller 22. In a case that the B-trigger switch 26*i* is continued to be pushed, it is possible to make movements and parameters of the player object constant. In a fixed case, the B-trigger switch 26*i* functions in the same way as a normal B-button, and is used for canceling the action and the command determined by the A-button 26*d*.

As shown in FIG. 3(E), an external expansion connector 22*b* is provided on a back end surface of the housing 22*a*, and as shown in FIG. 3(B), and an indicator 22*c* is provided on the top surface and the side of the back end surface of the housing 22*a*. The external expansion connector 22*b* is utilized for connecting another expansion controller not shown. The indicator 22*c* is made up of four LEDs, for example, and shows identification information (controller number) of the lighting controller 22 by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3(A), on the front end surface of the housing 22*a*, light incident opening 22*d* of the imaged information arithmetic section 80 is provided. Furthermore, the controller 22 has a speaker 86 (see FIG. 4), and the speaker 86 is provided inside the housing 22*a* at the position corresponding to a sound release hole 22*e* between the 1 button 26*b* and the HOME button 26*f* on the tope surface of the housing 22*a* as shown in FIG. 3(B).

Figure 3:
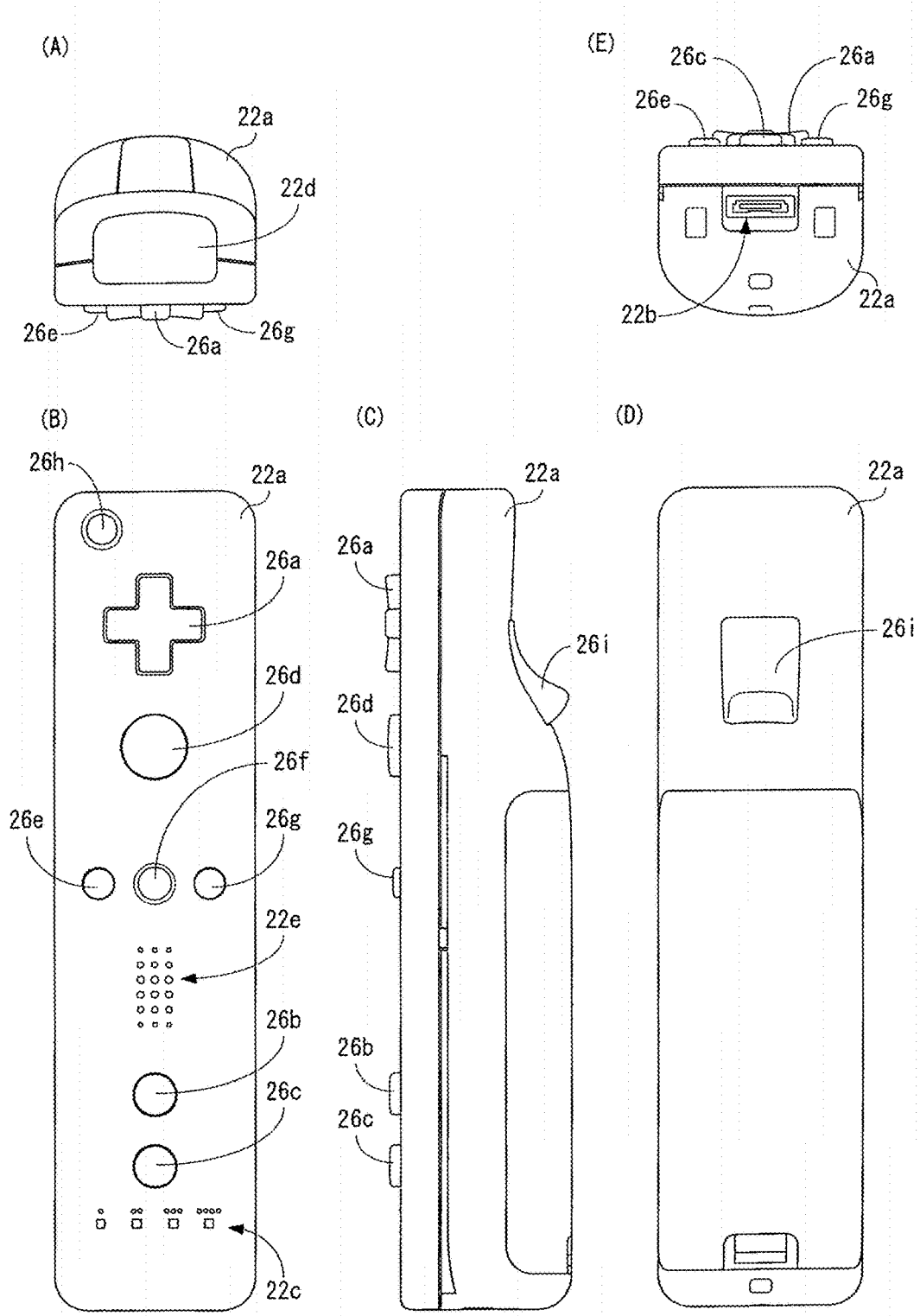
FIG. 3 is an illustrative view explaining an appearance of a controller shown in FIG. 1.

Note that as shown in FIG. 3 (A) to FIG. 3 (E), the shape of the controller 22 and the shape, number and setting position of each input means 26 are simply examples, and needless to say, even if they are suitably modified, the exemplary embodiments can be realized.

Figure 4:
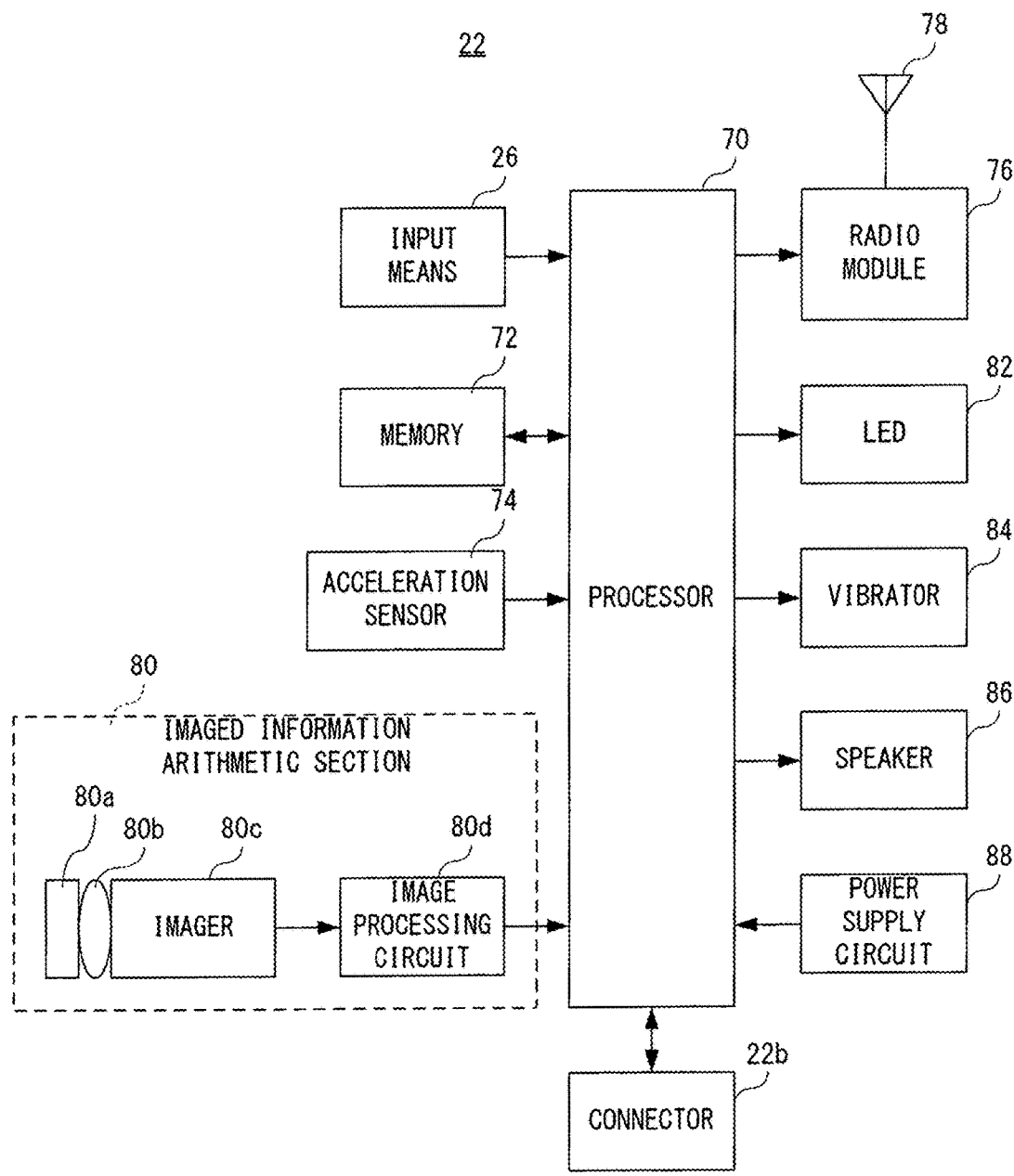
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

For simplicity, although omitted in FIG. 4, the indicator 22c is made up of the four LEDs 82 as described above.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area. An operation signal (operation data) from the aforementioned input means 26 (26a to 26i) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once.

The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22a and in the vicinity of the circuit board where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the input data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 82 to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80d is made later.

Figure 5:
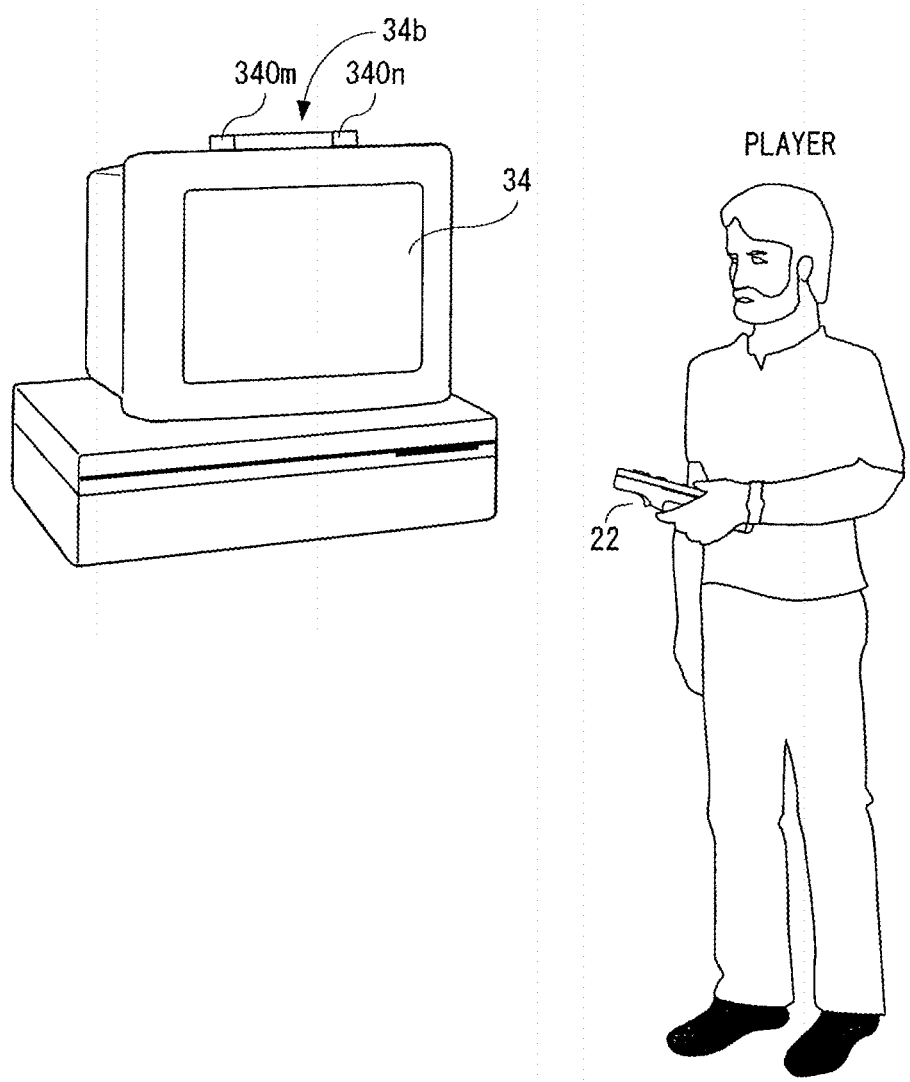
FIG. 5 is an illustrative view showing roughly explaining a state when a game is played by utilizing the controller shown in FIG. 1.

FIG. 5 is an illustrative view summarizing a state when a player plays a game by utilizing the controller 22. It should be noted that the same is true for a case that another application is executed or a DVD is reproduced as well as a game playing. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Figure 6:
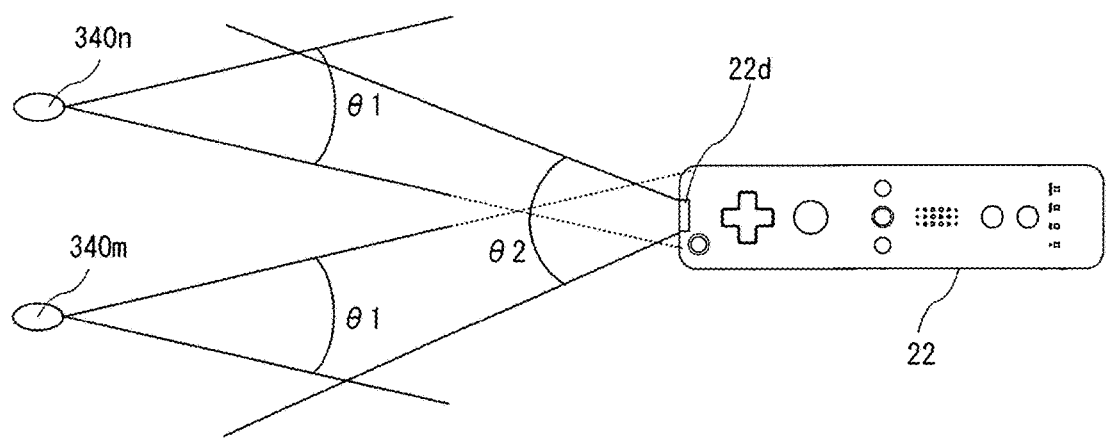
FIG. 6 is an illustrative view explaining view angels of the marker and the controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range."

Figure 7:
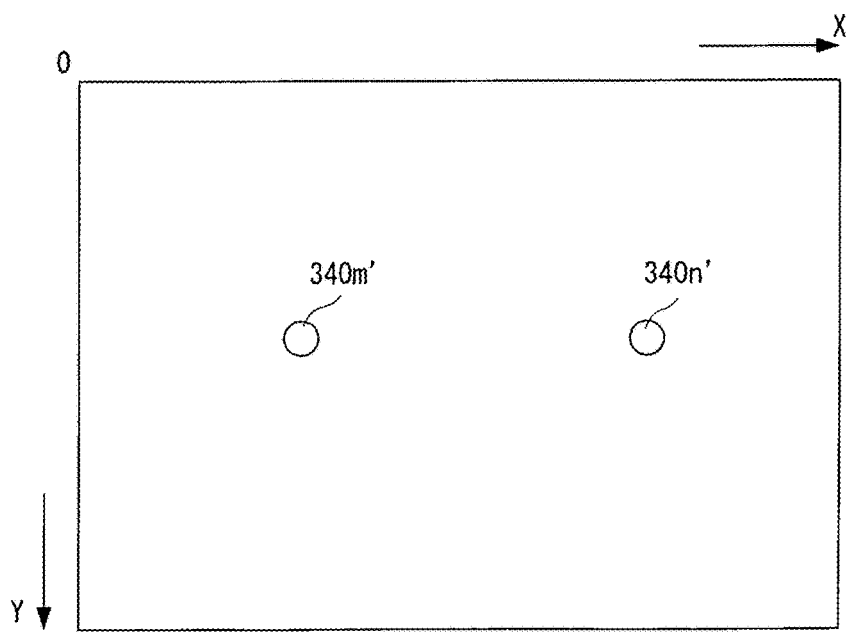
FIG. 7 is an illustrative view showing one example of an imaged image including object images.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is a view showing one example of the imaged image including an object image. The image processing circuit 80d calculates coordinates (marker coordinates) indicative of the position of each of the markers 340m and 340n in the imaged image by utilizing the image data of the imaged image including the object image.

Since the object image appears as a high-intensity part in the image data of the imaged image, the image processing circuit 80d first detects the high-intensity part as a candidate of the object image. Next, the image processing circuit 80d determines whether or not the high-intensity part is an object image on the basis of the size of the detected high-intensity part. The imaged image may include images other than the object image due to sunlight through a window and light of a fluorescent lamp in the room as well as the images 340m' and 340n' of the two markers 340m and 340n as an object image. The determination processing whether or not the high-intensity part is an object image is executed for discriminating the images 340m' and 340n' of the two markers 340m and 340n as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80d outputs data indicative of the calculated two marker coordinates. The data of the output marker coordinates (marker coordinate data) is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340m and 340n, and therefore, the game apparatus 12 can grasp the distance between the controller 22 and each of the markers 340m and 340n by calculating the distance between the two marker coordinates.

FIG. 8(A) shows one example of a menu screen 100 to be displayed on the monitor 34 in a case that a DVD is reproduced by means of the aforementioned game apparatus 12. FIG. 8(B) shows one example of a reproduced screen 200 to be displayed on the monitor 34 in the above-described case. For example, when in a DVD reproduction mode, a DVD as an optical disk 18 is loaded into the disk drive 54 of the game apparatus 12, the menu screen 100 as shown in FIG. 8(A) is displayed on the monitor 34.

On the menu screen 100 shown in FIG. 8(A), button images (icons) 102, 104, 106, 108 and 110 for selecting details to be reproduced are displayed. When the button image 102 is turned on, reproducing a main part of the content recorded in the DVD from the top is selected (instructed). When the button image 104 is turned on, reproducing a chapter 1 out of the main part of the content recorded in the DVD is selected. When the button image 106 is turned on, reproducing a chapter 2 out of the main part of the content recorded in the DVD is selected. When the button image 108 is turned on, reproducing a chapter 3 out of the main part of the content recorded in the DVD is selected. When the button image 110 is turned on, reproducing a bonus video (chapters other than above description) of the content recorded in the DVD is selected.

Although a detailed description is omitted, information on the button images (102-110, here) in association with the menu (menu screen 100, here) and information on the respective determination areas (display areas) are recorded in the DVD. Furthermore, the information on the button image is image data of the button image and coordinate data of the display position, for example, and the information on the determination area (display area) is coordinate data for defining the area, for example.

In addition, on the menu screen 100, an instruction image (finger mark) 120 is displayed. The instruction image 120 (the same is true for the instruction image 220 described later) is displayed at the instructed position when the player instructs the menu screen 100 (reproduced screen 220, 300, 400 described later) by utilizing the controller 22. FIG. 8(A) shows a state that the instruction image 120 instructs (selects) the button image 102. On the menu screen 100, the button image 102 is displayed in a color different from the other button images 104, 106, 108, 110 in order to inform that the button image 102 is being selected. However, this is merely one example, so the selected state of the button images may be represented such that the button images except for the selected button image are grayed out, the selected button image and the other button images are reversed in color, and so forth.

In addition, since a reproduction operation is prohibited on the menu screen 100 (there is no need of a reproduction operation), an operation panel 210 described later is not displayed. Accordingly, a display area for the operation panel 210 need no longer be ensured, capable of efficiently utilizing the display area On the menu screen 100, any one of the button images 102-110 is turned on to thereby execute a command corresponding to the button image 102-110. For example, as described above, reproduction of a main part or a specific chapter in the content is started to display a reproduced screen 200 on the monitor 34 as shown in FIG. 8(B). The reproduced screen 200 includes a display area 202 for video to display a video out of the reproduced content. Furthermore, at the bottom end of the display area 202 of the reproduced screen 200, the operation panel 210 is displayed, and at the right of the center of the display area 202, the instruction image 220 is displayed.

Although detailed description is omitted, in a case that the operation panel 210 is displayed on the reproduced screen 202, a video to be reproduced is displayed over the display area 202, and the display panel 210 is displayed so as to be overlapped with a part of the video, or a reproduced video to be reproduced can be displayed in a reduced manner at a area except where the operation panel 210 is displayed out of the display area 202.

The operation panel 210 is used for performing a reproduction operation of the DVD. In this embodiment, the operation panel 210 is provided with seven button images 210a, 210b, 210c, 210d, 210e, 210f, 210g. These button images 210a-210g are instructed (selected) by the instruction image 220 displayed according to an instructed position by the controller 22, and are turned on (decided) in response to the A button switch 26d being pushed, for example. Thereupon, the corresponding command is input to the game apparatus 12.

Although a detailed description is omitted, the instruction image 220, that is, the instructed position by the controller 22, and the display positions (display area) of each of the button images 210a-210g of the operation panel 210 which are displayed on the reproduced screen 200 are confirmed by the game apparatus 12. Thus, the game apparatus 12 identifies which button images 210a-210g is turned on by detecting in which display areas of the button images 210a-210g the instructed position by the controller 22 when the A button switch 26d is turned on is included. Then, the game apparatus 12 decides that a command corresponding to the identified button image 210a-210g is input.

When the button image 210a is turned on, the game apparatus 12 decides that a menu display command is input. Accordingly, a menu screen 100 as shown in FIG. 8(A) is displayed on the monitor 34. When the button image 210b is turned on, the game apparatus 12 decides that a fast-reverse command is input. In this embodiment, while the button 210b is turned on, the content which is being reproduced is reproduced at high speed in a reverse direction in time. When the button image 210c is turned on, the game apparatus 12 decides that a command for pause is input. Accordingly, the reproduction of the content is paused. Although illustration is omitted, at a state of the pause, the design of the button image 210c of the operation panel 210 is changed to a design representing reproduction, and when the button image 210c is turned on at the pause state, the state returns to the reproduction state. That is, the reproduction is restarted.

When the button image 210d is turned on, a fast-forward command is input. In this embodiment, while the button image 210d is turned on, the content which is being reproduced is reproduced at high speed in a forward direction in time. When the button image 210e is turned on, a heading command for returning a chapter is input. More specifically, when the button image 210e is turned on once, the chapter which is being reproduced returns to the head, and when the button image 210e is turned on twice successively, the chapter which is being reproduced returns to the head of the previous chapter. When the button image 210e is turned on three times or more successively, the same is true.

When the button image 210f is turned on, a heading command for forwarding the chapter is input. More specifically, the chapter which is being reproduced advances to a preceding chapter by the number of operations of the button 210f. When the button image 210g is turned on, a command for switching languages is input. In this embodiment, every time that the button image 210g is turned on, the languages are switched. For example, a plurality of language such as Japanese, English, Dutch, French, Spanish, Chinese, Korean, etc. are prepared for the content recorded in the DVD. Every time that the button image 210g is turned on, the languages are switched in this order. Furthermore, when a DVD, that is, a content like a movie is reproduced, the languages of a caption is also switched as well as voices. However, if languages cannot be switched as in provision of only one language, even if the button image 210g is turned on, the languages are not switched. Alternatively, in such a case, the button image 210g may be grayed out or no-displayed so as not to be turned on.

Furthermore, FIG. 9(A) shows another reproduced screen 300 to be displayed on the monitor 34. The reproduced screen 300 also includes a display area 302 of a video, and on the display area 302, a video and a screen button 310 are displayed. The screen button 310 is a button for requesting (accepting) an operation from a player or a user, integrally produced by an implementor, etc. of the DVD (content) in advance, and displayed/non-displayed (erased) at predetermined timing. For example, when the screen button 310 is turned on, information (video and text (message)) prepared in advance is displayed at the display area 302.

In a case that such a screen button 310 is displayed, the game apparatus 12 is required to detect an operation input as to an operation of the screen button 310, and therefore, an operation input as to a reproduction operation is prohibited. Accordingly, in a case that the screen button 310 is displayed, the operation panel 210 is not required, and therefore, in this embodiment, even if an instructed position by the controller 22 is on the reproduced screen 300, the operation panel 210 is erased.

This makes it possible to inform the player that a reproduction operation is impossible. Furthermore, owing to the erasure of the display panel 210, it is possible to make the most of the display area 302.

Although illustration is omitted, even if the reproduced screen 300 shown in FIG. 9(A) is displayed on the monitor 34, when any position on the reproduced screen 300 is instructed by the controller 22, the instruction image (120, 220) is displayed at the instructed position as described above.

Furthermore, although a detailed description is omitted, information on the screen button 310 and information on the determination area are recorded in the DVD. As described above, the information on the screen button 310 is image data of the screen button 310 and coordinate data of the display position, and the information on the determination area (display area) is coordinate data for defining the area, for example.

FIG. 9(B) shows another reproduced screen 400 to be displayed on the monitor 34. On the reproduced screen 400, a video is merely displayed on the display area 402. That is, the operation panel 210 and the screen button 310 as described above are never displayed. This is because that this is not timing when the screen button 310 is to be displayed, and no position on the screen is instructed by the controller 22.

Thus, in this embodiment, in a case that a menu is reproduced, or in a case that the screen button 310 is displayed in the middle of reproducing anything other than the menu, a reproduction operation is prohibited, and therefore, even if an instructed position by the controller 22 is on the reproduced screen (100, 300), the operation panel 210 is not displayed. In other words, the operation panel 210 is displayed when only needed.

Such judgment is executed on the basis of the content data. For example, content data as to a menu and content data as to anything other than the menu (main part and bonus video) are recorded in a DVD. FIG. 10(A) shows one example of data structure of the content data as to the menu, and FIG. 10(B) shows one example of data structure of the content data as to the main part (including a bonus video).

As understood from FIG. 10(A) and FIG. 10(B), the content data of the menu and the content data of the main part have the same data structure. Specifically, the content data includes control information, video information, sound information, . . . , and command information. Although illustration is omitted, the content data of the menu and the content data of the main part are identified by an identifier (header information, label).

The control information is information on the presence or absence of the screen button 310, a display timing and an erasure timing of the screen button 310, and on permission or prohibition of a reproduction operation such as whether or not the fast-forward button, the fast-reverse button, and the heading button are valid or invalid. The video information is information on a video (main video and sub-video) to be reproduced, and the video data is compressed according to an MPEG standard, for example. The sound information is information on a voice to be reproduced, and audio data is also compressed according to an MPEG standard. The command information is information on an order of reproduction, and is deferent between the content data of the menu and the content data of the main part. For example, in the content data of the menu, a command for jumping to the main part after end of the reproduction or after lapse of a preset time from the start of the reproduction is described as command information. Furthermore, in the content data of the main part, a command for reproducing a still image after completion of reproducing a motion image (main part) is described as command information.

Although omitted in the drawings, the content data includes other information (language information, etc.) necessary for reproduction.

Figure 11:
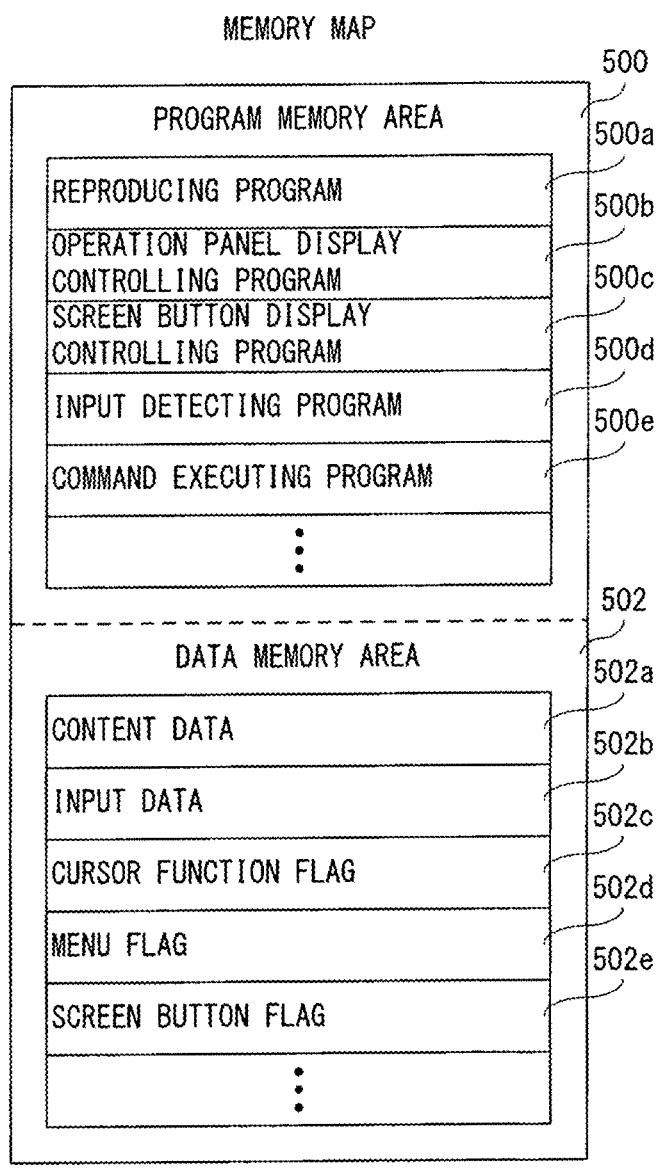
FIG. 11 is an illustrative view showing a memory map of an internal memory in the game apparatus shown in FIG. 1.

FIG. 11 shows an illustrative view showing a memory map of a main memory (42e, 46) shown in FIG. 2. As shown in FIG. 11, the main memory includes a program memory area 500 and a data memory area 502. The program memory area 500 stores a reproduction controlling program, and the reproduction controlling program is made up of a reproducing program 500a, an operation panel display controlling program 500b, a screen button display controlling program 500c, an input detecting program 500d, a command executing program 500e, etc.

The reproducing program 500a is a program for reproducing a content including at least a video, and reproduces a content like a video and a voice which are read from the optical disk 18 such as a DVD. It should be noted that the content data such as videos, voices, etc. may be downloaded. Accordingly, the video is output to the monitor 34, and the voice is output from the speaker 34a. Furthermore, the reproducing program 500a turns off a menu flag 502d described later when jumping from the menu to the main part is made according to command information of the content data of the menu, and turns on the menu flag 502d when jumping from the main part to the menu is made according to command information of the content data of the main part.

The operation panel display controlling program 500b is a program for controlling a display of the operation panel 210 on the reproduced screen. In this embodiment, while the main part is reproduced and in a case that the screen button 310 is not displayed, when the controller 22 instructs a position on the reproduced screen, the operation panel 210 is displayed. Here, whether or not the main part is being reproduced is judged on the basis of the menu flag 502d, and whether or not the screen button 310 is displayed is judged on the basis of a screen button flag 502e. Accordingly, in a case that the menu screen 100 is displayed, or in a case that the screen button 310 is displayed on the reproduced screen 300, the operation panel 210 is erased (non-displayed) from the reproduced screen 300.

The screen button display controlling program 500c is a program for controlling the display of the screen button 310 on the reproduced screen 300. In this embodiment, when the control information of the content data of the main part indicates that there is a screen button, the screen button 310 is displayed on the reproduced screen 300 at the display timing of the screen button. Furthermore, the screen button 310 is erased from the reproduced screen 300 at erasure timing of the screen button. Furthermore, the screen button display controlling program 500c turns on the screen button flag 502e described later when the screen button 310 is displayed, and turns off the screen button flag 502e when the screen button 310 is non-displayed.

The input detecting program 500d is a program for detecting input data from the controller 22, and storing (temporarily storing) the detected input data in the data memory area 502. Here, as described above, the input data includes at least one of operation data, acceleration data and marker coordinate data.

The command executing program 500e is a program for judging a content (meaning) of a command indicated by operation input data and marker coordinate data from the controller 22 on the basis of a cursor function flag 502c described later, and executing the processing according to the command. For example, according to the command executing program 500e, the CPU 40 executes reproduction and stop of the content, executes fast reverse, fast forward, pause (reproduction), heading, switch between the languages in the middle of reproducing the content.

Although illustration is omitted, the reproduction controlling program includes other programs such as a program for switching the languages.

The data memory area 502 stores content data 502a and input data 502b. Furthermore, the data memory area 502 is provided with the cursor function flag 502c, the menu flag 502d and the screen button flag 502e.

The content data 502a is content data as to a menu and a main part as shown in FIG. 10(A) and FIG. 10(B). The input data 502b is data including at least one of operation data, acceleration data, and marker coordinate data from the controller 22 as described above.

Each of the cursor function flag 502c, the menu flag 502d and the screen button flag 502e is constructed by one-bit register. When each of the flags 502c-502f is turned on (established), a data value "1" is set to the register, and when each of the flags is turned off (unestablished), a data value "0" is set to the register.

The cursor function flag 502c is a flag for determining whether or not the cross key 26a has a cursor function. In a case that the cursor function flag 502c is turned on, a cursor function is set to the cross key 26a (first mode). Accordingly, in this case, by operating the respective operating portions of the cross key 26a, the corresponding direction can be instructed. On the other hand, in a case that the cursor function flag 502c is turned off, a function (a part of the function) as to a reproduction operation of a DVD is set to the cross key 26a (second mode). Accordingly, in this case, by operating the left operating portion of the cross key 26a, the fast reverse can be instructed, and by operating the right operating portion of the cross key 26a, the fast forward can be instructed.

The menu flag 502d is a flag for determining whether or not a menu is being reproduced. For example, as described above, in the middle of reproducing the main part, the menu flag 502d is turned off while in the middle of reproducing the menu, the menu flag 502d is turned on. Moreover, the menu flag 502d is turned on when jumping to the menu is made after completion of reproducing the main part, and turned off when jumping to the main part is made after completion of reproducing the menu or after a lapse of a preset time from the start of the reproduction.

The screen button flag 502e is a flag for determining whether or not the screen button 310 is being displayed. The screen button flag 502e is turned on at display timing of the screen button 310 and turned off at non-display (erasure) timing of the screen button 310 when the main part is reproduced.

Although illustration is omitted, the data memory area 502 is stored with other data, and provided with other flags, counters, etc.

More specifically, the CPU40 of the game apparatus 12 executes DVD reproduction controlling processing according to a flowchart shown in FIG. 12, FIG. 13, FIG. 14 and FIG. 15. It should be noted that in the DVD reproduction controlling processing, acceleration data out of the input data 502b is not used at all, and therefore, the description here is made on the basis of the assumption that the input data 502b includes at least one of the operation data and the marker coordinate data.

Figure 12:
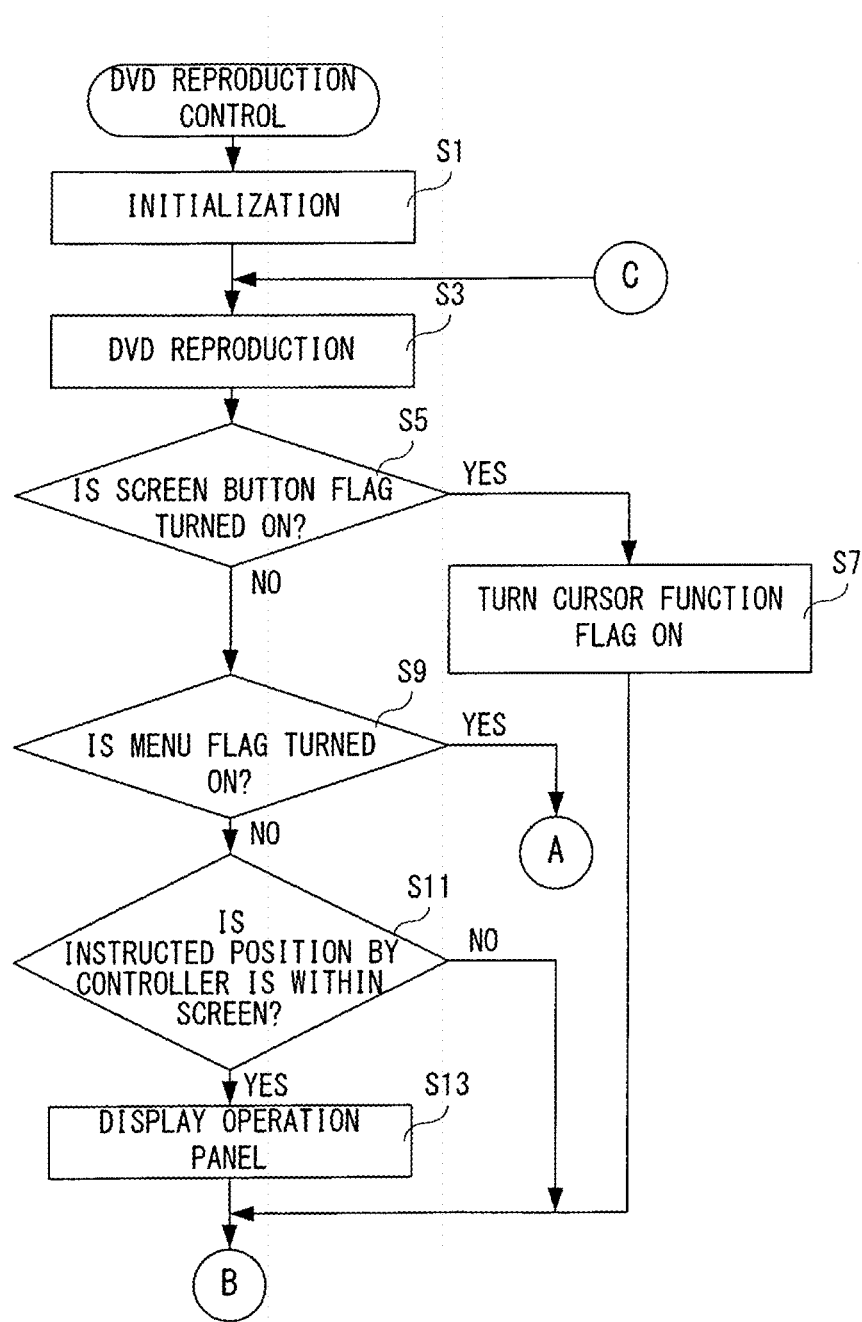
FIG. 12 is a flowchart showing a part of DVD reproduction controlling processing of the CPU shown in FIG. 2.

For example, when the power of the game apparatus 12 is turned on to select a reproduction mode of the DVD, the CPU40 starts the DVD reproduction controlling processing as shown in FIG. 12, and executes an initialization in a step S1. Here, various variables (flag 502c, 502d, 502e) are reset (turned off).

In a succeeding step S3, a DVD is reproduced. That is, a video content and a voice content are reproduced according to the content data as shown in FIG. 10(A) and FIG. 10(B). Accordingly, as described above, in the reproduction process in the step S3, turning on or off the menu flag 502d and the screen button flag 502e are controlled according to the control information. As described above, when the menu is reproduced, or in a case that jumping from the main part to the menu is made, the menu flag 502d is turned on, and when anything other than the menu is reproduced, or in a case that jumping from the menu to the main part is made, the menu flag 502d is turned off. Furthermore, in the middle of reproducing the main part, when a display timing of the screen button 310 has come, a display control of the screen button 310 is executed to turn on the screen button flag 502e. Furthermore, in the middle of reproducing the main part, when an erasure timing of the screen button 310 has come, an erasure control of the screen button 310 is executed to turn off the screen button flag 502e.

Successively, in a step S5, it is determined whether or not the screen button flag 502e is turned on. If "YES" in the step S5, that is, if the screen button flag 502e is turned on, by judging that the screen button 310 is displayed, and the cursor function flag 502c is turned on in a step S7, and then, the process proceeds to a step S27 in FIG. 14 described later. That is, in the step S7, the function of the cross key 26a is switched so as to be utilized as a cursor key for a direction instructing.

On the other hand, if "NO" in the step S5, that is, if the screen button flag 502e is turned off, by judging that the screen button 310 is not displayed, and it is judged whether or not the menu flag 502d is turned on in a step S9. That is, it is judged whether or not the menu is being reproduced. If "YES" in the step S9, that is, if the menu flag 502d is turned on, it is judged that the menu is being reproduced, and the process proceeds to a step S15 in FIG. 13 described later.

However, if "NO" in the step S9, that is, if the menu flag 502d is turned off, it is judged that anything other than the menu (main part, bonus video, here) is being reproduced, and it is judged whether or not the instructed position by the controller 22 is within the screen in a step S11. If "NO" in the step S11, that is, if the instructed position by the controller 22 is not within the screen, the process directly proceeds to the step S15. On the other hand, if "YES" in the step S11, that is, if the instructed position by the controller 22 is within the screen, the operation panel 210 is displayed in a step S13, and the process proceeds to the step S15.

Figure 13:
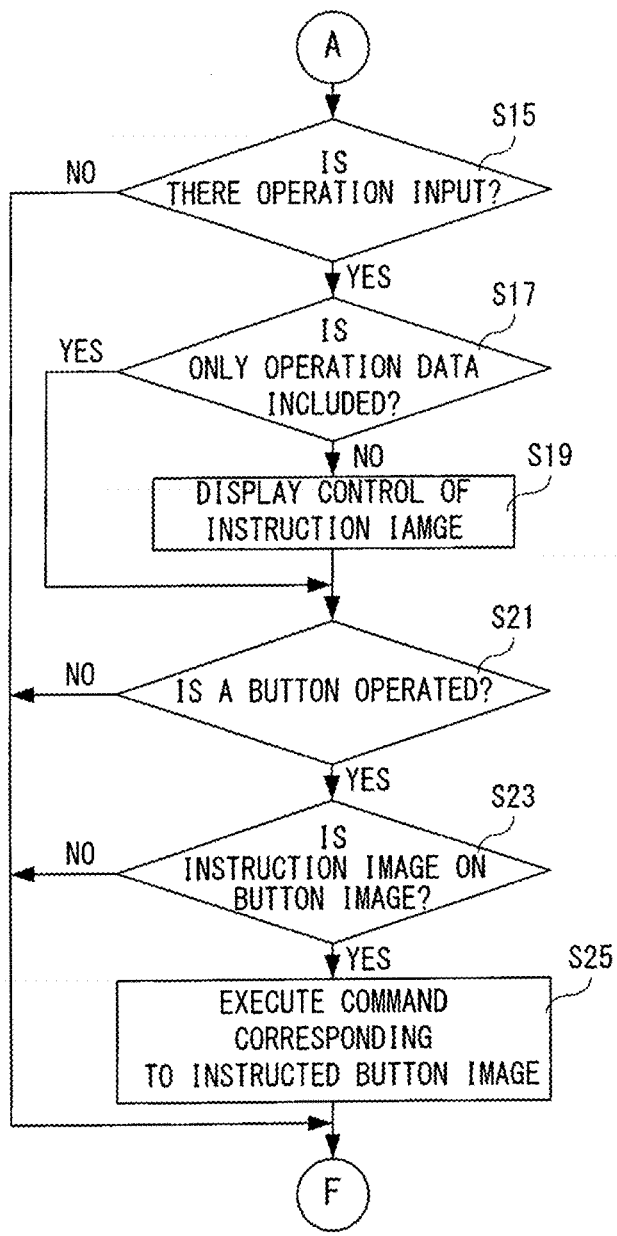
FIG. 13 is a flowchart, continued from FIG. 12, showing another part of the DVD reproduction controlling processing of the CPU shown in FIG. 2.

As shown in FIG. 13, in the step S15, it is judged whether or not there is an operation input. That is, it is judged whether or not the input data 502b is stored in the data memory area 520. If "NO" in the step S15, that is, if there is no operation input, the process directly proceeds to a step S39 shown in FIG. 14. On the other hand, if "YES" in the step S15, that is, if there is an operation input, it is judged whether or not only the operation data is included in a step S17. That is, it is judged whether or not only the operation data is included in the input data 502b.

If "YES" in the step S17, that is, if only the operation data is included, the process proceeds to a step S21. On the other hand, if "NO" in the step S17, that is, if only the marker coordinate data is included, a display control of the instruction image is executed in a step S19, and the process proceeds to the step S21. Briefly speaking, in the step S19, the instruction image 220 is displayed (moving-displayed) at the position (coordinates) indicated by the marker coordinate data on the screen.

In the step S21, it is judged whether or not the A button 26d is operated (turned on). If "NO" in the step S21, that is, if the A button 26d is not turned on, the process proceeds to the step S39. On the other hand, if "YES" in the step S21, that is, if the A button 26d is turned on, it is judged whether or not the instruction image 220 is on the button images 210a, 210b, 210c, 210d, 210e, 210f, 210g in a step S23. More specifically, it is judged whether or not the instruction image 220 is displayed on the display area of any one of the button images 210a, 210b, 210c, 210d, 210e, 210f, 210g.

If "NO" in the step S23, that is, if the instruction image 220 is not on the button images 210a, 210b, 210c, 210d, 210e, 210f, 210g, since the A button 26d is not turned on at a precise position, the process directly proceeds to the step S39. Here, in such a case, a message showing that after the instruction image 220 is precisely moved on the button image 210a-210g (operation panel 210), the A button 26d should be operated is given with a sound output or a text display, and then, the process may proceeds to the step S39.

On the other hand, if "YES" in the step S23, that is, if the instruction image 220 is on any one of the button images 210a, 210b, 210c, 210d, 210e, 210f, 210g, processing following a command according to the instructed button image 210a, 210b, 210c, 210d, 210e, 210f, 210g is executed in a step S25, and the process proceeds to the step S39. That is, in the step S25, processing indicated by the command (reproduction operation) assigned to the instructed button image 210a, 210b, 210c, 210d, 210e, 210f, 210g which is turned on (clicked) by the controller 22 functioning as a pointing device is executed.

Additionally, when processing according to the command is executed, the input data 502b is erased. Hereafter, the same is true for a case that processing according to the input data 502b is executed.

Figure 14:
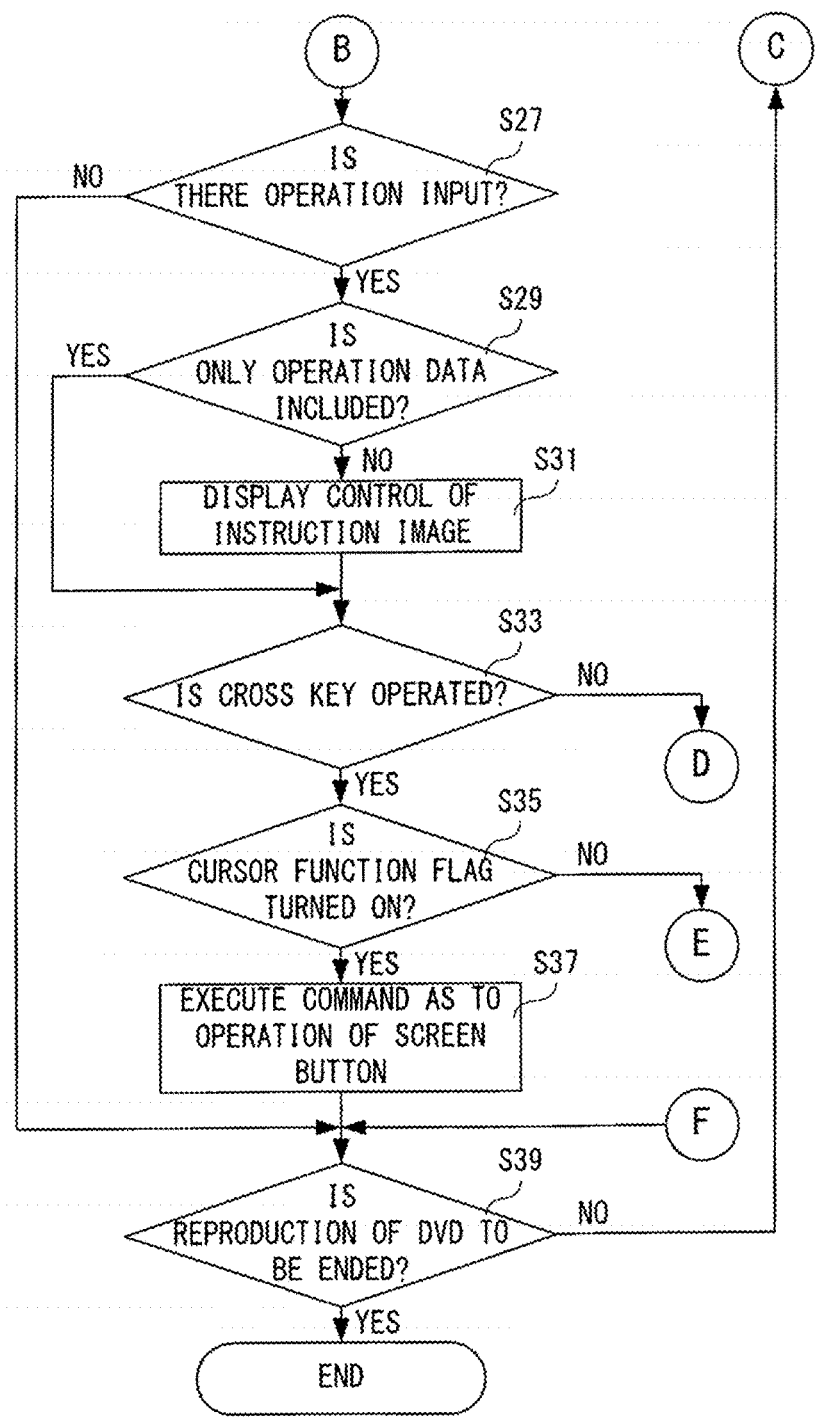
FIG. 14 is a flowchart, continued from FIG. 12, showing still another part of the DVD reproduction controlling processing of the CPU shown in FIG. 2.

As shown in FIG. 14, in the step S27, it is judged whether or not there is an operation input. If "NO" in the step S27, that is, if there is no operation input, the process directly proceeds to the step S39. On the other hand, if "YES" in the step S27, that is, if there is an operation input, it is judged whether or not only the operation data is included in a step S29. If "YES" in the step S29, that is, if only the operation data is included, the process directly proceeds to the step S33. On the other hand, if "NO" in the step S29, that is, if only the marker coordinate data is include, a display control of the instruction image 220 is executed in a step S31, and then, the process proceeds to the step S33.

In the step S33, it is judged whether or not the cross key 26a is operated. That is, it is judged whether or not the operation data as to each of the upper, lower, left, and right operating portions is stored in the data memory area 502 as input data 502b. If "NO" in the step S33, that is, if the cross key 26a is not operated, the process proceeds to a step S41 shown in FIG. 15. On the other hand, if "YES" in the step S33, that is, if the cross key 26a is operated, it is judged whether or not the cursor function flag 502c is turned on in a step S35. That is, in the step S35, the function (first mode or second mode) of the cross key 26a is identified.

Figure 15:
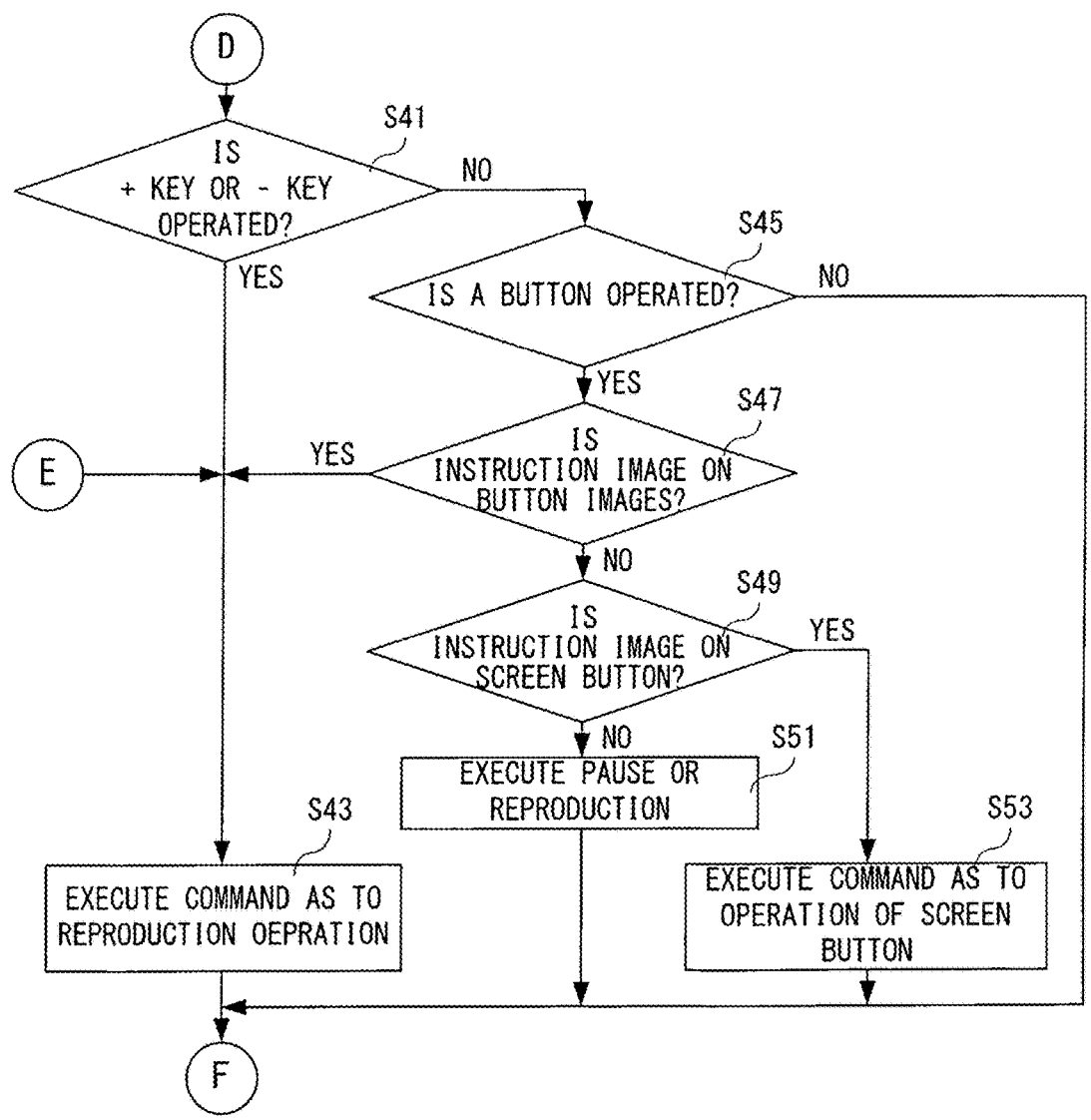
FIG. 15 is a flowchart, continued from FIG. 14, showing a further part of the DVD reproduction controlling processing of the CPU shown in FIG. 12.

If "NO" in the step S35, that is, if the cursor function flag 502c is turned off, the process directly proceeds to a step S43 shown in FIG. 15. On the other hand, if "YES" in the step S35, that is, if the cursor function flag 502c is turned on, by judging that a reproduction operation is prohibited, and a command as to an operation of the screen button 310 is executed in a step S37, and then, the process proceeds to the step S39. That is, in the step S37, the screen button 310 is pushed according to an operation of the cross key 26a to execute processing being brought into correspondence with he screen button 310. However, if an operation (direction) requested by the screen button 310 and a direction indicated by the input data 502b (operation data) are not coincident with each other, the operation is made invalid, and no processing is executed.

In the step S39, it is judged whether or not the reproduction of the DVD is to be ended. Here, it is judged whether or not reproduction of all the contents recorded in the DVD is ended, whether or not reproduction of a specified chapter is ended, or whether or not an instruction for ending reproduction is input from the player. If "NO" in the step S39, that is, if the reproduction of the DVD is not to be ended, the process returns to the step S3 shown in FIG. 12 to continue the reproduction of the DVD. On the other hand, if "YES" in the step S39, that is, if the reproduction of the DVD is to be ended, the DVD reproduction controlling processing is ended.

As shown in FIG. 15, in the step S41, it is judged whether or not the + key 26g or the − key 26e is operated. That is, it is determined whether or not operation data of the + key 26g or the − key 26e is stored in the data area 502 as input data 502b. If "YES" in the step S41, that is, if any one of the + key 26g or the − key 26e is operated, the process proceeds to a step S43 described later. On the other hand, if "NO" in the step S41, that is, if both of the + key 26g and the − key 26e are not operated, it is judged whether or not the A button 26d is operated in a step S45. That is, it is judged whether or not the operation data of the A button 26d is stored in the data memory area 502 as input data 502b.

If "NO" in the step S45, that is, if the A button 26d is also not operated, it is judged that the input means 26 except for the cross key 26a, the − key 26e, the + key 26g and the A button 26d is operated, and the process proceeds to the step S39 shown in FIG. 14. However, as described above, if there is an instruction for ending the DVD reproduction, the CPU40 judges that the reproduction of the DVD is to be ended in the step S39. On the other hand, if "YES" in the step S45, that is, if the A button 26d is operated, it is judged whether or not the instruction image 220 is on the button images 210a, 210b, 210c, 210d, 210e, 210f, 210g in a step S47.

If "YES" in the step S47, that is, if the instruction image 220 is on the button images 210a, 210b, 210c, 210d, 210e, 210f, 210g, the process proceeds to the step S43. In the step S43, a command as the reproduction operation is executed, and the process proceeds to the step S39 shown in FIG. 14. Although a detailed description is omitted, in the step S43, fast forward reproduction or fast reverse reproduction according to the + key 26g or the − key 26e is executed, or processing corresponding to the clicked button images 210a, 210b, 210c, 210d, 210e, 210f, 210g is executed.

On the other hand, if "NO" in the step S47, that is, if the instruction image 220 is not on the button images 210a-210g, it is judged whether or not the instruction image 220 is on the screen button 310 in a step S49. If "NO" in the step S49, that is, if the instruction image 220 is not on the screen button 310, pause or reproduction (restart) is executed in a step S51, and then, the process proceeds to the step S39. That is, in the step S51, it is judged that the A button 26d is turned on as a remote controller function to thereby pause the reproduction or restart the reproduction. On the other hand, if "YES" in the step S49, that is, if the instruction image 220 is on the screen button 310, processing according to the command as to the screen button 310 is executed in a step S53, and then, the process proceeds to the step S39.

According to this embodiment, only in the operation permittable case, the operation panel is displayed, and therefore, it is possible to improve operability, and moreover utilize the display area efficiently.

A game system 10 of another embodiment is the same as the above-described embodiment except for that even in the middle of reproducing the menu, in a case that the reproduction operation is not prohibited, the operation panel can be displayed as required, and therefore, a duplicated description is omitted. This is because that there are some DVDs which exceptionally permit a reproduction operation even in the middle of reproducing the menu.

More specifically, it is detected whether or not a reproduction operation is prohibited in the middle of reproducing the menu reproduction in the control information included in the content data. If the reproduction operation is prohibited, even if the controller 22 instructs the screen, the operation panel 210 is not displayed in the middle of reproducing the menu similar to the above-described embodiment. On the other hand, in a case that a reproduction operation is permitted, when the controller 22 instructs the screen, the operation panel 210 is displayed even in the middle of reproducing the menu.

Furthermore, in the middle of reproducing the menu, the screen button as shown in the above-described embodiment is never displayed, and therefore, such a case is not assumed.

Figure 16:
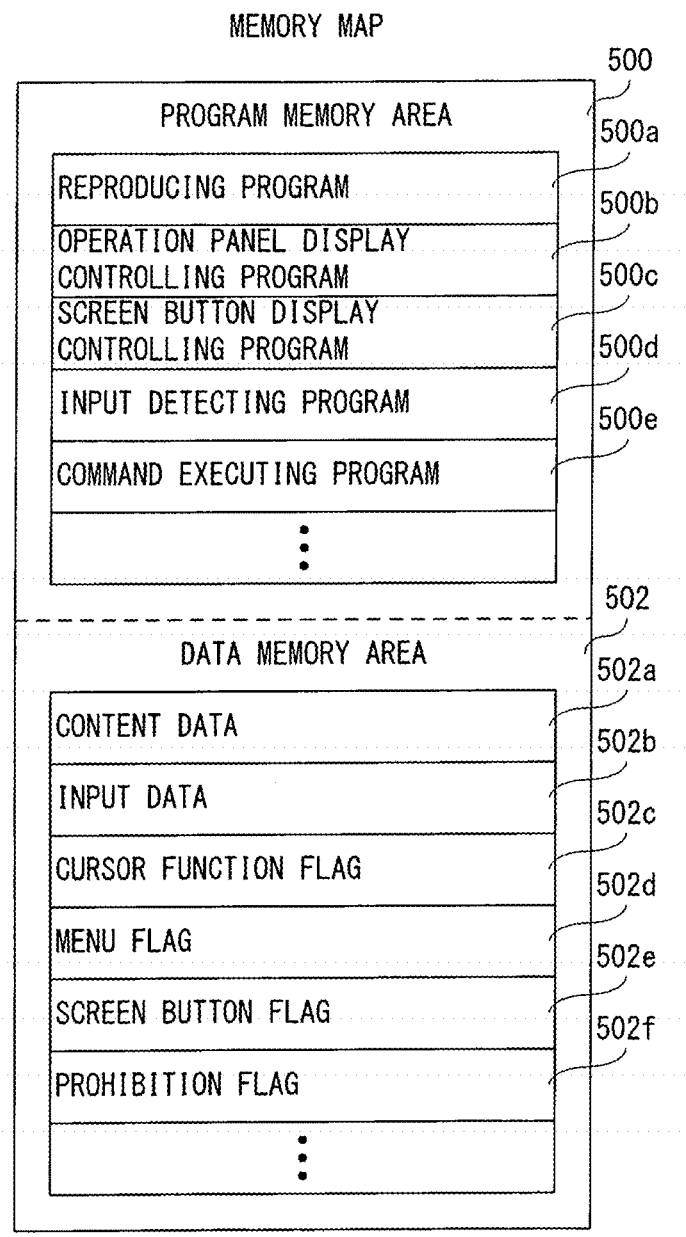
FIG. 16 is an illustrative view showing a memory map of a main memory in another embodiment.

Thus, in this embodiment, as shown in FIG. 16, a prohibition flag 502$f$ is further provided to the data memory area 502 in order to detect whether or not a reproduction operation is prohibited. The prohibition flag 502$f$ is constructed by one-bit register, and when the prohibition flag 502$f$ is turned on, a data value "1" is set to the register. When the prohibition flag 502$f$ is turned off, a data value "0" is set to the register.

It should be noted that the prohibition flag 502$f$ is turned on or off according to the reproducing program 500$a$. More specifically, in a case that prohibition of the reproduction operation is described in the control information included in the content data of the menu, the prohibition flag 502$f$ is turned on, and in a case that permission of a reproduction operation is described, the prohibition flag 502$f$ is turned off.

Figure 17:
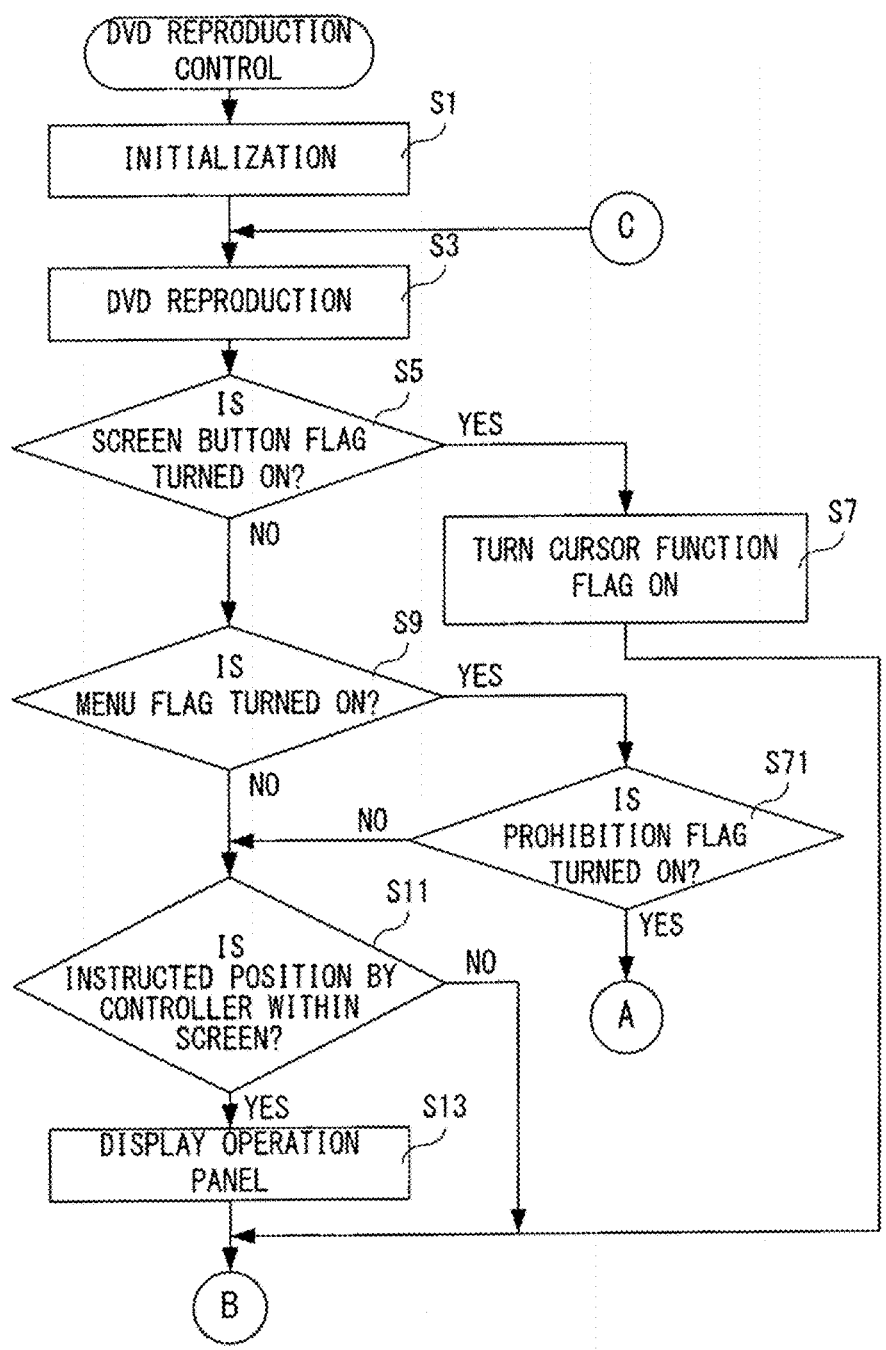
FIG. 17 is a flowchart showing a part of the DVD reproduction controlling processing of the CPU in another embodiment.

The detailed processing by the CPU40 is only partially different from the reproduction control processing in FIG. 12-FIG. 15, and therefore, only the different points are illustrated and explained. In the reproduction control processing of this embodiment, as shown in FIG. 17, a step S71 is provided between the step S9, the step S11 and the step S15 in the reproduction control processing in FIG. 12-FIG. 15 described above. That is, if "NO" in the step S9, it is judged whether or not the prohibition flag 502$f$ is turned on in the step S71.

It should be noted that the prohibition flag 502$f$ is turned on or off on the basis of the control information of the content data of the menu when the DVD is reproduced according to the reproducing program 500$a$ in the step S3.

If "NO" in the step S71, that is, if the prohibition flag 502$f$ is turned off, it is judged that a reproduction operation is permitted, and the process proceeds to the step S11. On the other hand, if "YES" in the step S71, that is, if the prohibition flag 502$f$ is turned on, it is judged that a reproduction operation is prohibited, and the process proceeds to the step S15.

In this another embodiment, similar to the above-described embodiment, only in the operation permittable case, the operation panel is displayed, and therefore, it is possible to improve operability, and moreover utilize the display area efficiently.

Furthermore, in the above-described embodiment, an optical disk such as a DVD is reproduced, but this is not restricted thereto. For example, a video content may be reproduced from the memory card attached to the game apparatus, or a video content recorded through downloading in the internal memory (42$e$, 44, 46) of the game apparatus can be reproduced.

Furthermore, in the above-described embodiment, in the middle of reproducing anything other than the menu, in a case that the screen button is not displayed, when the controller instructs the screen, the operation panel is displayed. However, even when the controller does not instruct the screen, the operation panel may be displayed. This makes it possible to inform the player that it is possible to make a reproduction operation. Furthermore, since this is not the unnecessary case, advantages of certain exemplary embodiments can be attained.

In addition, in the above-described embodiment, in the middle of anything other than the menu and in a case that the screen button is not displayed, the operation panel is made displayable, but in a case that any one of the condition is satisfied, the operation panel is made displayable. That is, in a case of a video content without a screen button, if only anything other than the menu is being reproduced, the operation panel is made displayable. Additionally, in a case of a video content with a screen button, if a reproduction operation is permitted irrespective of being the menu or not, when the screen button is not displayed, the operation panel is made displayable.

In addition, in the above-described embodiment, only a network game system by utilizing a video game system separately having a game apparatus and a monitor is explained, but it is not necessarily restricted thereto. In place of the game system, a general-purpose computer, or a hand-held type game apparatus and a hand-held terminal such as a cellular phone, PC, PDA which have a reproduction function of a content can be used.

Furthermore, in the above-described embodiment, a case that a DVD is reproduced by the game apparatus as an information processing apparatus is explained, but exemplary embodiments described herein can be applied to other information processing apparatuses, such as a PC provided with a DVD reproduction device, etc.

Although certain exemplary embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a video reproduction controlling program for reproducing video content with an information processing apparatus provided with an operating portion, the video reproduction controlling program, when executed, causes a computer of the information processing apparatus to at least:
reproduce the video content for display on a display associated with the information processing apparatus;
display a prompt on the display at predetermined timing during reproduction of the video content and according to the reproduction of the video content, the displayed prompt requesting an input from the operating portion;
while the video content is being reproduced and when the input from the operating portion is not requested by the prompt displayed at the predetermined timing according to the reproduction of the video content, display an operation panel including a plurality of controls, each for making a different reproduction operation of the video content, wherein the reproduction operations include pause, play, reverse, and fast forward operations; and
determine a presence or absence of an input from the operating portion, and display the operation panel when it is determined that there is an input.

2. The non-transitory storage medium storing the video reproduction controlling program according to claim 1, wherein the video reproduction controlling program causes the computer to further determine whether the video content which is being reproduced is anything other than a menu in the video content, and display the operation panel when it is determined that the video content is anything other than the menu.

3. The non-transitory storage medium storing the video reproduction controlling program according to claim 1, wherein the video reproduction controlling program causes the computer to further detect an input from the operating portion, and execute different processing modes in dependence on the input detected, the processing modes being a first mode allowing an input in response to a request and a second mode allowing an input similar to the operation panel.

4. The non-transitory storage medium storing the video reproduction controlling program according to claim 1, wherein:
the video content includes video information and control information for performing a control at a time of reproducing the video information in an one-to-one correspondence,
the prompt requesting the input from the operating portion is displayed according to the control information being brought into correspondence with the video information which is being currently reproduced, and
a determination is made as to whether an input from the operating portion is requested according to the control information being brought into correspondence with the video information which is being currently reproduced.

5. The non-transitory storage medium storing the video reproduction controlling program according to claim 1, wherein the operating portion is a pointing device, and the presence or absence of the input is determined from the pointing device.

6. The non-transitory storage medium storing the video reproduction controlling program according to claim 5, wherein:
the prompt is a screen button,
the video content includes screen button information including at least display timing of the screen button to be displayed,
the screen button is displayable according to the display timing included in the screen button information,
an input is requested from the operating portion by displaying the screen button,
a determination is made as to whether an input from the operating portion is requested depending on whether the screen button is displayed according to the display timing included in the screen button information, and
the video reproduction controlling program causes the computer to further determine whether the screen button is instructed by the pointing device according to the screen button information in a case that it is determined that there is an input from the pointing device.

7. The non-transitory storage medium storing the video reproduction controlling program according to claim 6, wherein the screen button information further includes image information and displayed coordinate information of the screen button.

8. The non-transitory storage medium storing the video reproduction controlling program according to claim 5, wherein:
a determination is made as to whether a valid input is made in the video reproduction controlling program when there is an input from the pointing device, and
the operation panel is displayed in a case that the video content is determined to be anything other than a menu, and when the valid input is made in the video reproduction controlling program.

9. The non-transitory storage medium storing the video reproduction controlling program according to claim 1, wherein video content stored in an optical disk is reproduced.

10. The non-transitory storage medium storing the video reproduction controlling program according to claim 1, wherein:
the prompt is a screen button,
the video content includes screen button information including at least display timing of the screen button to be displayed,
the screen button is displayed according to the display timing included in the screen button information, and an input is requested from the operating portion by displaying the screen button,
a determination is made as to whether an input from the operating portion is requested depending on whether the screen button is displayed according to the display timing included in the screen button information.

11. The non-transitory storage medium storing the video reproduction controlling program according to claim 10, wherein the screen button information further includes image information and displayed coordinate information of the screen button.

12. The non-transitory storage medium storing the video reproduction controlling program according to claim 1, wherein the plurality of controls of the operation panel include a reproduction command, a pause command, a reverse command, and a fast-forward command.

13. The non-transitory storage medium storing the video reproduction controlling program according to claim 1, wherein the displayed prompt requests a predefined input from the operating portion, and the information processing apparatus is further configured to:
when the prompt is displayed, receive an input from the operating portion; and
determine whether the received input from the operating portion corresponds to the predefined input requested by the displayed prompt; and
when the received input corresponds to the predefined input requested by the displayed prompt, execute a command corresponding to the prompt.

14. The non-transitory storage medium storing the video reproduction controlling program according to claim 1, wherein the prompt is displayed over the displayed video content at a predefined location indicated by coordinate information for the prompt provided with the video content.

15. A non-transitory storage medium storing a video reproduction controlling program for reproducing video content by an information processing apparatus provided with an operating portion, the video reproduction controlling program, when executed, causes a computer of the information processing apparatus to at least:
display the video content on a display associated with the information processing apparatus;
request an input from the operating portion by displaying on the display, while displaying the video content on the display, a screen button according to a screen button display timing included in the video content;
determine whether the video content reproduced for display is a menu in the video content;
display an operation panel including a plurality of controls, each for making a different reproduction operation of the video content, the reproduction operations including pause, play, reverse, and fast forward operations, the operation panel being displayed while the video content is displayed on the display and when it is determined that the video content is anything other than the menu, wherein the operation panel is not displayed when it is determined that the video content is the menu, and is not displayed when it is determined that the screen button is displayed according to the screen button display timing included in the video content; and determine a presence or absence of an input from the operating portion, wherein the operation panel is displayed when it is determined that there is an input.

16. The non-transitory storage medium storing the video reproduction controlling program according to claim 15, wherein the video reproduction controlling program further causes the computer to detect an input from the operating portion, wherein processing is executed according to the detected input, and invalidate the detected input as to the reproduction operation of the video content in a case that it is determined that the displayed video content is a menu.

17. The non-transitory storage medium storing the video reproduction controlling program according to claim 15, wherein the video content is made up of a plurality of kinds of data including a plurality of kinds of information, and each data is assigned an identifier for identifying the respective kinds, and determining whether the data is anything other than a menu in the video content is performed according to the identifier assigned to the data which is being displayed.

18. The non-transitory storage medium storing the video reproduction controlling program according to claim 15, wherein the operating portion is a pointing device, and a presence or absence of an input from the pointing device is determined.

19. The non-transitory storage medium storing the video reproduction controlling program according to claim 18, wherein the video content includes screen button information including the screen button display timing, the screen button is displayed according to the screen button display timing included in the screen button information, an input is requested from the operating portion by displaying the screen button, the determination of whether an input from the operating portion is requested depends on whether the screen button is displayed according to the screen button display timing included in the screen button information, and the video reproduction controlling program further causes the computer to determine whether the screen button is instructed by the pointing device according to the screen button information in a case that the determination is made that there is an input from the pointing device.

20. The non-transitory storage medium storing the video reproduction controlling program according to claim 19, wherein the screen button information further includes image information and displayed coordinate information of the screen button.

21. The non-transitory storage medium storing the video reproduction controlling program according to claim 18, wherein the video reproduction controlling program further causes the computer to determine whether a valid input is made when there is an input from the pointing device, and the operation panel is displayed in a case that the determination is made that the video content is anything other than a menu, and when a valid input in the video reproduction controlling program is made.

22. The non-transitory storage medium storing the video reproduction controlling program according to claim 15, wherein the video content is stored in an optical disk.

23. The non-transitory storage medium storing the video reproduction controlling program according to claim 15, wherein input buttons separate from a menu are displayed when the video content is being displayed.

24. The non-transitory storage medium storing the video reproduction controlling program according to claim 15, wherein the plurality of controls of the operation panel include a reproduction command, a pause command, a reverse command, and a fast-forward command.

25. A video reproduction controlling apparatus for reproducing video content, the apparatus comprising:
memory;
an operating portion; and
a processing system coupled to the memory and the operating portion, the processing system including at least one processor and being configured at least to:
reproduce the video content for display on a display associated with the video reproduction controlling apparatus;
display a prompt on the display at predetermined timing during reproduction of the video content and according to the reproduction of the video content, the displayed prompt requesting an input from the operating portion;
while the video content is being reproduced and when the input from the operating portion is not requested by the prompt displayed at the predetermined timing according to the reproduction of the video content, display an operation panel including a plurality of controls, each for making a different reproduction operation of the video content, wherein the reproduction operations include pause, play, reverse, and fast forward operations; and
determine a presence or absence of an input from the operating portion, and display the operation panel when it is determined that there is an input.

26. The video reproduction controlling apparatus according to claim 25, wherein the video content includes display timing indicating when during the reproduction of the video content to display the prompt on the display and when during the reproduction of the video content to stop displaying the prompt on the display.

27. The video reproduction controlling apparatus according to claim 25, wherein the video content includes display timing for the prompt, and an image of the prompt and coordinate data for the prompt, and
wherein the displaying the prompt according to the reproduction of the video content includes displaying, on the display based on the coordinate data, the image of the prompt at predetermined timing determined by the display timing.

28. A video reproduction controlling apparatus for reproducing video content, the apparatus comprising:
memory;
an operating portion; and
a processing system coupled to the memory and the operating portion, the processing system including at least one processor and being configured at least to:
reproduce the video content for display on a display associated with the video reproduction controlling apparatus;
while displaying the video content on the display, request an input from the operating portion by displaying, on the display, a screen button according to a screen button display timing included in the video content;

determine whether the video content displayed is a menu in the video content; and display an operation panel including a plurality of controls, each for making a different reproduction operation of the video content, the reproduction operations include pause, play, reverse, and fast forward operations, the operation panel being displayed while the video content is displayed on the display and the displayed video content is determined to be anything other than the menu, wherein the operation panel is not displayed in a case that the displayed video content is determined to be the menu, and the operation panel is not displayed in a case that the screen button is displayed according to the screen bottom display timing included in the video content; and determine a presence or absence of an input from the operating portion, and display the operation panel when it is determined that there is an input.

29. A video reproduction controlling method of a video reproduction controlling apparatus which has an operating portion and reproduces video content, the method comprising:

reproducing, via at least one processor of the apparatus, the video content for display on a display associated with the video reproduction controlling apparatus, displaying a prompt on the display at predetermined timing during reproduction of the video content and according to the reproduction of the video content, the displayed prompts requesting an input from the operating portion, while the video content is being reproduced and when the input from the operating portion is not requested by the prompt displayed at the predetermined timing according to the reproduction of the video content, displaying, via the at least one processor, an operation panel including a plurality of controls, each for making a different reproduction operation of the video content, wherein the reproduction operations include pause, play, reverse, and fast forward operations; and determining a presence or absence of an input from the operating portion, and displaying the operation panel when it is determined that there is an input.

30. A video reproduction controlling method of a video reproduction controlling apparatus which has an operating portion and is programmed to reproduce video content, the method comprising:

reproducing the video content for display on a display associated with the video reproduction controlling apparatus;

while displaying the video content on the display, requesting an input from the operating portion by displaying on the display a screen button according to a screen button display timing included in the video content;

determining whether the displayed video content is anything other than a menu in the video content; and displaying an operation panel including a plurality of controls, each for making a different reproduction operation of the video content, wherein the reproduction operations include pause, play, reverse, and fast forward operations, wherein the operation panel is displayed while the video content is displayed on the display and the video content is determined to be anything other than the menu, the operation panel is not displayed in a case that the video content is determined to be the menu, and the operation panel is not displayed in a case that the screen button is displayed according to the screen button display timing included in the video content; and determining a presence or absence of an input from the operating portion, and displaying the operation panel when it is determined that there is an input.

31. A video reproduction controlling system configured to reproduce video content, comprising:

an operating portion;

at least one processor and a memory;

a video content reproducer configured to reproduce the video content for display on a display associated with the video reproduction controlling apparatus;

an operation instruction requestor configured to display a prompt on the display at predetermined timing during reproduction of the video content and according to the reproduction of the video content by the video content reproducer, the displayed prompt requesting an input from the operating portion;

an operation panel displaying mechanism configured to display, while the video content is being reproduced and when the input from the operating portion is not requested by the prompt displayed at the predetermined timing according to the reproduction of the video content, an operation panel including a plurality of controls, each for making a different reproduction operation of the video content, wherein the reproduction operations include pause, play, reverse, and fast forward operations; and an input determining mechanism configured to determine a presence or absence of an input from the operating portion, and wherein the operation panel displaying mechanism displays the operation panel when the input determining mechanism determines that there is an input.

32. A video reproduction controlling apparatus configured to reproduce video content, comprising:

at least one processor and a memory;

an operating portion;

a video content reproducing reproducer configured to reproduce the video content for display on a display associated with the video reproduction controlling apparatus;

an instruction request outputting mechanism configured to request, while the video content is displayed according to the reproduction, an input from the operating portion by displaying on the display a screen button according to a screen button display timing included in the video content;

a video content determining mechanism configured to determine whether the video content reproduced for display by the video content reproducer is a menu in the video content;

an operation panel displaying mechanism configured to display an operation panel including a plurality of controls, each to make a different reproduction operation of at least the video content in a case that the video content determining mechanism determines that the video content is anything other than the menu, wherein the reproduction operations include pause, play, reverse, and fast forward operations, and the operation panel displaying mechanism is further configured to not display the operation panel in a case that the video content determining mechanism determines that the video content is the menu, and to not display the operation panel in a case that the screen button is displayed according to the screen button display timing included in the video content; and an input determining mechanism configured to determine a presence or absence of an input from the operating portion, and wherein the operation panel displaying mechanism displays the operation panel when the input determining mechanism determines that there is an input.

* * * * *